United States Patent [19]
Belser

[11] Patent Number: 6,008,960
[45] Date of Patent: Dec. 28, 1999

[54] SPLIT TABLE GENERATOR AND METHOD FOR FORMAT DATA COMPRESSION IN DISK DRIVES

[75] Inventor: Karl Arnold Belser, San Jose, Calif.

[73] Assignee: International Business Machines Corporation, Armonk, N.Y.

[21] Appl. No.: 08/702,389

[22] Filed: Aug. 14, 1996

[51] Int. Cl.$^6$ ..................................... G11B 5/09
[52] U.S. Cl. ............................................. 360/48
[58] Field of Search .................... 360/46, 48, 60, 360/51; 369/275.1; 380/23; 395/888

[56] References Cited

U.S. PATENT DOCUMENTS

| | | | |
|---|---|---|---|
| 4,814,904 | 3/1989 | Shigihara et al. | 360/60 |
| 4,993,069 | 2/1991 | Matyas et al. | 380/23 |
| 5,166,837 | 11/1992 | Nakamura | 360/46 |
| 5,237,675 | 8/1993 | Hannon, Jr. | 395/888 |
| 5,325,352 | 6/1994 | Matsumoto | 369/275.1 |
| 5,422,763 | 6/1995 | Harris | 360/51 |
| 5,754,351 | 5/1998 | Kuen et al. | 360/48 |

*Primary Examiner*—W. Chris Kim
*Attorney, Agent, or Firm*—Gray Cary Ware Freidenrich

[57] ABSTRACT

A method and apparatus for generating very small split tables from an even smaller amount of information preferably stored on a medium in a system track. The present invention takes advantage of the fact that the pattern of split data cells is periodic. Each split table can be generated upon initial application of power from a relatively few parameters stored in the system track. A method is provided by the present invention for generating each split table based upon the zone number, the number of track wedges within the period of the repeat pattern, the rate at which data is to be written in the zone and two additional parameters. In addition, the present invention is a method and apparatus for increasing the efficiency of the medium by adjusting the size of each zone to minimize the number of split data cells stored on the medium. In accordance with the present invention, the size of each zone is selected based upon the length of the repeat pattern. Therefore, in accordance with the present invention, the size of each zone is preferably optimized in order to optimize the efficiency with which data can be stored on the medium. The present invention also allows the organization of zones to be optimized for each particular format of the DASD, thus allowing the particular format of the DASD to be changed without significantly reducing the efficiency with which data is stored on the medium. Also, equalizer sub-zones are defined.

26 Claims, 10 Drawing Sheets

ABSTRACT

SPLIT TABLE GENERATOR AND METHOD FOR FORMAT DATA COMPRESSION IN DISK DRIVES

BACKGROUND OF THE INVENTION

1. Field of the Invention

The present invention relates generally to direct access storage devices, and more particularly to a method and apparatus for generating split tables which increase the efficiency with which data is store on a direct access storage device by determining the amount of data which should be stored between boundaries on the direct access storage device.

2. Description of the Related Art

Consumer demand has been unrelenting for increased data storage capacity which can be made available to a computer user by a device with a physical profile that is the same or smaller than previous devices which provide less capacity. Even as the ability to store more information in less space is provided, the demand for even greater storage capacity in yet less space arises. There are essentially two ways in which a manufacturer of a data storage unit can increase data storage capacity available to a user of a data storage device without increasing the size the of the storage medium within the device. First, the areal density can be increased. Areal density is the total number of bytes of information that can be stored per square inch of area on a storage medium. Second, the efficiency with which the medium is used can be increased. Efficiency is equal to the number of bytes of information which are available for use by the user, divided by the theoretical number of bytes that could be stored on the media if there were no area lost to overhead.

FIG. 1 is an illustration of the manner in which data is organized on a medium in accordance with one particular type of direct access storage device (DASD), commonly referred to as an embedded servo disk drive. In accordance with the DASD shown in FIG. 1, data is organized in data cells 101 stored within tracks 102 on a storage medium 103. The data is read and written by a read/write head which is suspended over the medium as the medium rotates about a central axis through the center of the medium 104 and perpendicular to the plane of the medium 103. Each track 102 is comprised of all the information stored on the medium 103 at a particular radial distance from the center 104 of the medium 103. Tracks 102 can be identified either by the radial distance of the track from the center of the medium, or by a track number which is assigned sequentially to each track 102 starting at the track furthest from the center of the medium. In order to use the medium in the most efficient manner, the tracks lie in close proximity to one another. However, for the sake of clarity, the tracks 102 shown in FIG. 1 are spaced relatively far apart. The width of a track 102 is determined by the width of the read/write head and the skew angle of the read/write head (i.e., the angle of the longitudinal axis of the read/write head with respect to a line parallel to the tangent of the track 102) and the track misregistration tolerance of the head positioning servo. Each track 102 is divided by servo sectors 107 into a plurality of data wedges 105 in which data is stored. Each servo sector 107 includes information used to determine the radial and circumferential position of the read/write head (i.e., the particular track 102 in a particular data wedge 105 over which the read/write head is suspended at each point in time). U.S. Pat. No. 5,285,327 provides information related to servo sectors and is incorporated by herein by reference. That portion of a track 102 which lies within one data wedge is hereafter referred to as a "track wedge" 106.

Each data cell 101 on the medium 103 typically stores a uniform amount of information (512 bytes, for example). However, as can be seen from FIG. 1, the length of each track varies as a function of the radial distance of the track from the center 104 of the medium 103. FIG. 2 is an slightly more detailed illustration of a section of a storage medium 103. A portion of a data wedge comprising eight track wedges (i.e., portions of a track which lie completely within one data wedge) is shown in FIG. 2, each of the four inner most track wedges 102a having three data cells 101. The four outer most track wedges 102b each have four data cells 101. Tracks 102 are grouped into two "servo zones" (hereafter referred to as "zones") in which the data written to each of the tracks 102 within the same zone is written at a constant rate determined by a data clock. Accordingly, each track 102 within the same zone has the same number of data cells 101. Since the data wedges 105 formed between the servo sectors 107 are generally "pie" shaped, the outer track wedges 102b are larger, and thus are capable of storing more information than the inner track wedges 102b. Therefore, by increasing the frequency at which data is written for zones which are further from the center of the medium, the number of data cells 101 that are written at the outer portion of each data wedge 105 is greater than the number of data cells 101 that are written at the inner portion of each data wedge 105. That is, if the number of bytes within each data cell 101, and the number of data cells 101 within each track wedge 106 were held constant, then the tracks at the outer diameter of the medium would have far lower bit density than the tracks at the inner diameter of the medium. In a first attempt to more efficiently write data to the medium, zones were defined by setting the data clock frequency to a rate at which the maximum number of whole data cells 101 are stored in each track wedge. For example, referring to FIG. 2, data is written at the same rate for each track in which the length of each track wedge is insufficient to allow an entire fourth data cell 101 to be written therein without violating the maximum bit density which the medium can support. Accordingly, the rate at which data is written to the inner most track of a zone is set at the greatest rate at which data could reliably be stored and which would result in the most whole data cells 101. The data rate is only increased when the increase in the data rate would result in both an acceptable bit density (i.e., a bit density that is less than the maximum bit density supportable by the medium), and one additional whole data cell being written in each track wedge. Therefore, even if the medium could reliably store data at a greater density, the data rate would be limited to that rate which resulted in an integer number of data cells 101 being written in each track wedge. Accordingly, moving radially outward from the last zone boundary, the next zone boundary occurs when data can be reliably stored at a rate which results in an entire additional data cell 101 being stored within each track wedge. It can be seen that this results in the length $d_2$ being essentially equal to the length $d_1$, as shown in FIG. 2.

In addition to using zones in which the number of data cells is increased by interger increments causing data to be written at a different rate for each zone in order to maintain closer to maximum bit density in each track, some DASDs are also designed to increase storage efficiency by increasing the number of data cells 101 that are stored in each track wedge 106 by an amount other than an integer value. Thus, data cells 101 are "split" across servo sectors 107. FIG. 3 is an illustration of a portion of a medium in which data cells 101 are split across servo sectors 107. By splitting data cells 101a, 101b, 101c, 101d across the servo sector 107b, the number of tracks in each zone can be decreased. As a result, the data rate can be increased, and thus the bit density increased, in smaller increments and over smaller radial intervals. Referring to FIG. 3, the rate at which data is written in zone 1 and zone 3 will be essentially equal to the rate at which data is written in zones 1 and 2 of FIG. 2. Accordingly, the length of a track wedge $d_2$ shown in FIG. 3 is the same as the length $d_2$ shown in FIG. 2. Also the length of a track wedge $d_4$ shown in FIG. 3 is equal to the length of the track wedge $d_1$ shown in FIG. 2. However, the data rate of zone 2 of FIG. 3 is slightly greater than the data rate of zone 1, resulting in the length of the track wedge $d_3$ being equal to the length $d_2$ and $d_4$, and the data rate of zone 4 is slightly greater than the data rate of zone 3, resulting in the length $d_5$ of the track wedge 102f also being equal to the length of the $d_2$ and $d_4$. By increasing the bit density (i.e., increasing the rate at which data is written) at smaller intervals than would be required to add one whole data cell 101 to each track wedge 106, the storage capacity available to the user is greater than would otherwise be available if the zones were defined by the requirement that each data cell be entirely stored in only one track wedge 106. U.S. Pat. No. 5,210,660 discloses one method for splitting data across more than one wedge, and is incorporated herein by reference.

One problem with the use of split data cells arises from the fact that the data clock which is used in the timing of data read and write operations is free running with respect to the angular velocity of the medium. This data clock must be synchronized to the angular velocity of the medium prior to the start of each data cell 101 and also to the start of a byte. Accordingly, each data cell must begin with a "header" which includes a variable frequency oscillator (VFO) field and a synchronization (sync) field, among other fields. Since the header reduces the storage capacity which would otherwise be available to the user, headers in general adversely effect the efficiency of the DASD. In particular, each time a data cell 101 is split across two data wedges, the end portion of a split data cell 101 is spaced too far from the sync field associated with the beginning of that data cell. Therefore, the end portion of the split data cell 101 must begin with a new header. It can be seen that including a header for the end portion of the split data cell 101 means that each split data cell 101 requires two headers rather than one. Accordingly, the benefit of using split data cells to increase the bit density of some of the tracks is offset by a decrease in the efficiency of the DASD due to the need for additional headers.

In addition to the inefficiency that results from the need to include an additional header for each portion of each split data cell, a mechanism is required which allows the data channel to determine whether either the first or last data cell 101 within each track wedge are part of a split data cell. One such mechanism is a "split table". A split table includes:

(1) a flag which indicates whether there is a partial data cell written at the beginning of the track wedge 106;
(2) the number of data bytes in the partial data cell written at the beginning of the track wedge 106;
(3) the number of new data cells that are started in the track wedge 106;
(4) a flag which indicates whether there is a partial data cell written at the end of the track wedge 106; and
(5) the number of data bytes in the partial data cell written at the end of the track wedge 106.

One such split table must be generated for each zone. In addition, each such split table would have a set of each of the five entries listed above associated with each data wedge 105. Therefore, if the medium had 90 such data wedges (i.e., 90 servo sectors), and 15 zones, then the number of entries to all 15 tables would be 90×15=1350. The number of bits required for each of these entries depends in part on the format of the data cells. For example, if the data cell is configured to be 512 bytes long, only nine bits is required for the portion of each entry that indicates the number of data bytes in the partial data cell written at the beginning and end of the track wedge 106. However, in a system in which 738 bytes may be included in each data cell, the number of data bytes in the partial data cell at either the beginning or end of the data wedge must be expressed using at least 10 bits.

Inefficiencies can account for a loss to the user of more than 25% of the otherwise useable data storage area. Due to the relatively large capacity of current data storage devices, even small increases of the efficiency can make relatively large blocks of additional capacity available to the user. In the highly competitive market for data storage devices, such improvements in the efficiency of a data storage device can result in improved sales and greater market share.

Accordingly, it is an object of the present invention to provide a system and method for optimizing the manner in which data cells are split across zones. Another object of the present invention is to provide a system and method for generating split tables that can be regenerated from a minimal amount of data stored on the medium. Still another object of the present invention is to provide a system and method for defining equalizer sub-zones to ensure proper equalization of the data channel in view of zones which include differing numbers of tracks. Yet another object of the present invention is to provide a DASD in which various formats can each be optimized in order to provide the most efficient selection of zone sizes, and thus the most efficient medium.

SUMMARY OF THE INVENTION

The present invention is a method and apparatus for generating very compact split tables from a small amount of information which is preferably stored on the medium in a system track. The present invention takes advantage of the fact that the pattern of split data cells is periodic (i.e., repeats at regular intervals). Therefore, a relatively small split table which provides split information for each track wedge in the first period of the pattern can also be used to provide split information for each other track wedge in each track of the entire zone. Furthermore, the present invention takes advantage of the fact that the split table for each servo zone (hereafter referred to as "zone") can be generated upon initial application of power from a relatively few parameters stored in the system track. For example, in the preferred embodiment of the present invention, the split table for each zone can be generated from four parameters. The first parameter is the period of the repeat pattern in units of track wedges. The second parameter is "total wedge bytes" which is the number of data bytes that can be written on the inner most track of a zone in the time required for the read/write head to move through a track wedge from beginning to end. The third parameter is the number of "data cell bytes" which is different for different user data record sizes within the data cell. The fourth is the number of "header bytes which is the number of bytes just preceding the user data. A method is provided by the present invention for generating each split table based upon the total wedge bytes, the data cell bytes, the header bytes, and the number of track wedges to be written within the period of the split repeat pattern for each zone.

In addition, the present invention is a method and apparatus for increasing the efficiency of the medium (i.e., the amount of user information that can be stored and read from the medium) by adjusting the size of each zone to minimize the number of split data cells stored on the medium. In accordance with the present invention, the size of each zone (i.e., the number of tracks which are to be included within each zone) is selected based upon the length of the repeat pattern. It will be seen that the shorter the repeat pattern, the fewer split data cells occur, and the less information must be generated in the split table for that zone. Accordingly, for zones in which the repeat pattern is shorter, the amount of overhead is lower, and thus the efficiency of the DASD is improved. Therefore, zones with relatively short repeat patterns are preferably sized to include more tracks than zones with relatively longer repeat patterns. However, as the zone becomes larger, the efficiency of the track is decreased by the fact that the bit density of the tracks at the outer portion of the zone is lower. Therefore, in accordance with the present invention, the size of each zone is preferably optimized in order to optimize the efficiency with which data can be stored on the medium.

Still further, the present invention allows the organization of zones to be optimized for each particular format of the DASD, thus allowing the particular format of the DASD to be changed without significantly reducing the efficiency with which data is stored on the medium.

In addition, in the preferred embodiment of the present invention, equalizer sub-zones are defined. An integer number of equalizer sub-zones are provided within each zone. Equalizer sub-zones allow an equalizer within a data channel of the DASD to properly equalize the data channel. Equalizer sub-zones allow the equalizer to make adjustments based upon changes in the bit density of the information stored within each zone.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 4:
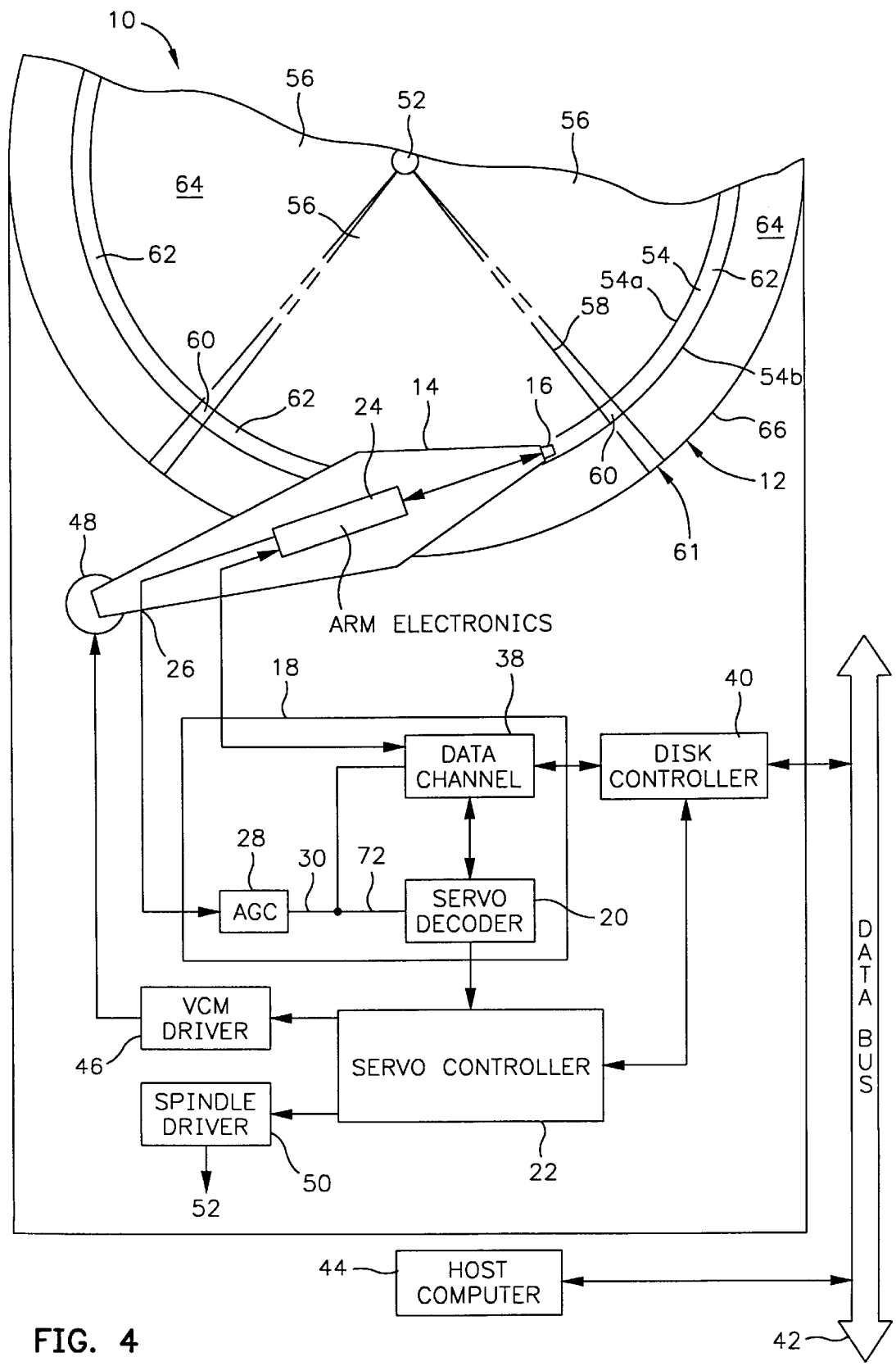
FIG. 4 is an illustration of a particular DASD in accordance with the present invention.

FIG. 4 is an illustration of a particular direct access storage device (DASD) in accordance with the present invention. In particular, the DASD of FIG. 4 is a sector servo magnetic disk drive 10 constructed in accordance with the present invention. However, it should be understood that the present invention may be used in any DASD in which the storage medium is divided into discrete data wedges. The DASD shown in FIG. 4 is shown merely for illustrative purposes.

The disk drive of FIG. 4 includes a disk 12 that is rotated and a disk arm 14 that is moved radially across the disk 12. Information is read and recorded from the disk 12 as a sequence of transitions by an essentially conventional read/write head 16. A channel chip 18 contains essentially conventional read control circuitry for the detection and decoding of the readback signal from the head 16. The chip 18 also contains essentially conventional write control circuitry for the encoding and modulation of the write current from or to the head 16. In addition, the chip 18 detects servo sector fine tracking, track number, and servo sector number information that corresponds to the disk track over which the head 16 is actually located. The servo decoder 20 provides the track identification number to a servo controller 22 in a conventional manner. In response, the servo controller controls movement of the disk arm 14. The servo controller also provides the sector count information to the data channel 38 in a conventional manner. The data channel then generates the correctly timed read and/or write gates for its control.

In one embodiment, the readback signal produced by the read/write head 16 is provided to an arm electronics ("AE") 24 mounted on the servo arm 14. The AE performs two functions. First, the AE provides a fast, high current write pulse for driving the recording head when data is being written. Second, the AE amplifies the read back signal from the head and provides the amplified signal over a pre-amplifier output line 26 to the channel chip 18. In the channel chip, the signal is preferably received at an automatic gain control (AGC) circuit 28 that adjusts the gain applied to the servo signal to maintain the signal amplitude within a range that is predetermined to simplify information processing, reduce noise, and improve system linearity. The amplified signal from the AGC circuit 28 is provided over an AGC output line 30 to a data channel circuit 38 and the servo decoder 20.

The data channel circuit 38 processes the signal provided by the AGC to reproduce user data recorded on the disk 12 and provides such data to a disk controller 40. In one embodiment of the present invention, the data channel includes a signal equalizer for preconditioning the analog data signal and a data separator for converting the equalized data signal into ones and zeros synchronous to a channel clock signal. From the disk controller, the user data is provided to a data bus 42, where the data is received by a host computer processor 44. The servo decoder 20 receives the output from the AGC circuit 28, produces the disk track and servo sector identification numbers, and provides these numbers to the servo controller 22. In one embodiment of the present invention, the servo decoder includes a signal equalizer for preconditioning the analog servo signal and a position error signal (PES) demodulator 36 which receives the AGC output and produces a PES which is coupled to the servo controller 22. The servo controller 22 uses the servo sector identification number to control the timing of the data channel, uses the track identification number to move the head to a desired track in a track seek operation and, if provided, uses the PES to maintain the head centered over a track in a track following operation.

The disk controller 40 receives requests for reading and recording data on the disk from the host computer 44 and thereby determines a desired disk track number at which to position the read/write head 16. The disk controller 40 generates control signals to position the read/write head over for the desired track, and provides the control signals to the servo controller 22. In accordance with one embodiment of the present invention, the control signals cause movement of the disk arm 14 radially across the disk during track seek and track following by causing the servo controller 22 to provide servo signals to a voice controlled motor (VCM) driver 46. The VCM driver 46 generates servo control signals to control a VCM servo 48 that moves the disk arm 14. The servo controller 22 also provides drive signals to a spindle motor driver 50, which generates spindle control signals to control a drive motor 52 that controls rotation of the disk 12. The servo controller 22 uses the servo sector identification number to control the timing of the data channel.

The servo information read by the read/write head 16 is recorded at a predetermined location in each "track" of the disk 12. In FIG. 4, a pair of concentric circular lines 54a, 54b designate a single track 54 of the disk. Only one servo track is shown in FIG. 4 for simplicity of illustration. A single track preferably includes several track wedges 62, each spaced apart from two adjacent track wedges 62 by a servo pattern 60. The boundaries of each track wedge 62 are represented in the illustration by dashed radial lines 58. Each of the track wedges 62 which lie within the boundaries of two adjacent servo patterns 60 form a data wedge 56. The readback signal generated by the read/write head 16 when it reads the track 54 represents servo information when the head is over a servo sector 61 which includes each servo pattern 60 located at the same angular location on the medium. Likewise, the readback signal generated by the read/write head 16 represents data channel information when over a track wedge 62. Data in each track wedge is formatted in data cells. Tracks 54 are grouped into "servo zones" (hereafter referred to as "zones") in which the data written to each of the tracks 102 within the same zone is written at a constant rate determined by a data clock. Accordingly, each track 54 within the same zone has the same number of data cells. It should be noted that since each track 54 within a zone is has the same number of data cells, each track wedge within a particular zone and a particular data wedge 56 also has the same number of data cells. However, the bit density of each track wedge varies as a function of the radial distance of the track wedge from the center of the medium.

Data Cell Format

Figure 1:
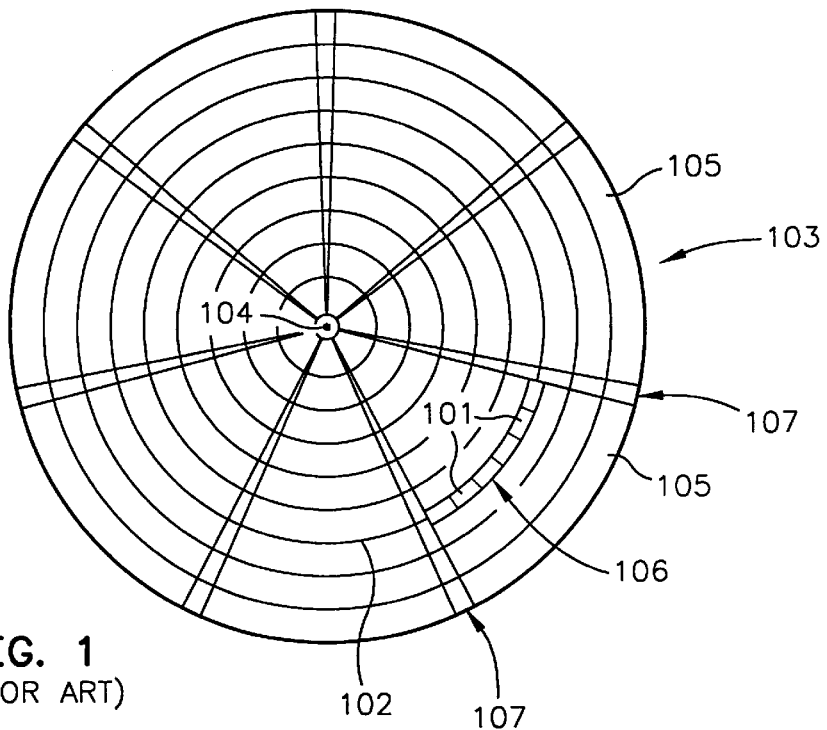
FIG. 1 is an illustration of the manner in which data is organized on a medium in accordance with one particular type of DASD.
Figure 2:
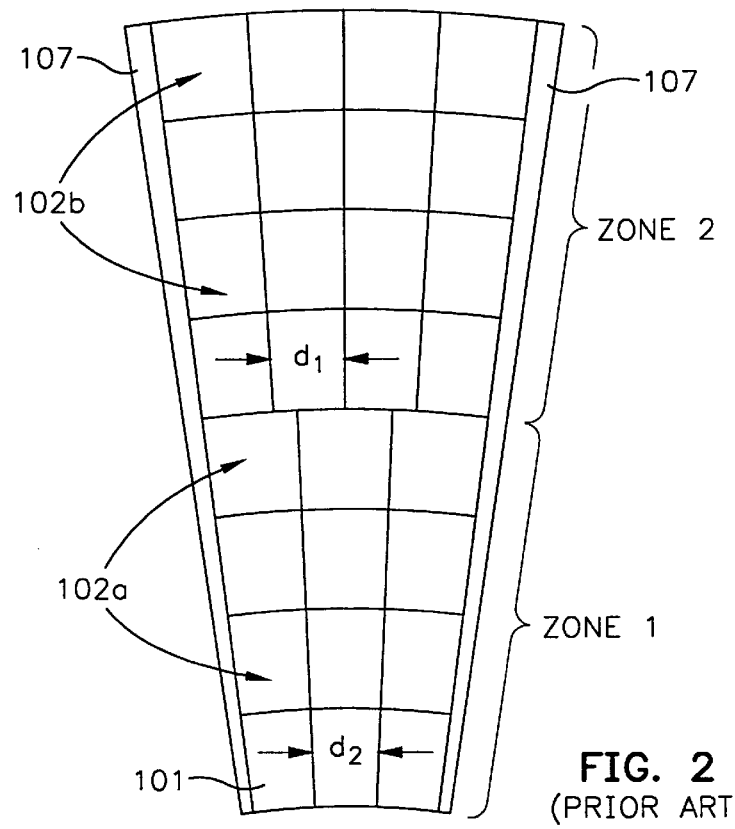
FIG. 2 is an slightly more detailed illustration of a section of a storage medium of the DASD of FIG. 1.
Figure 3:
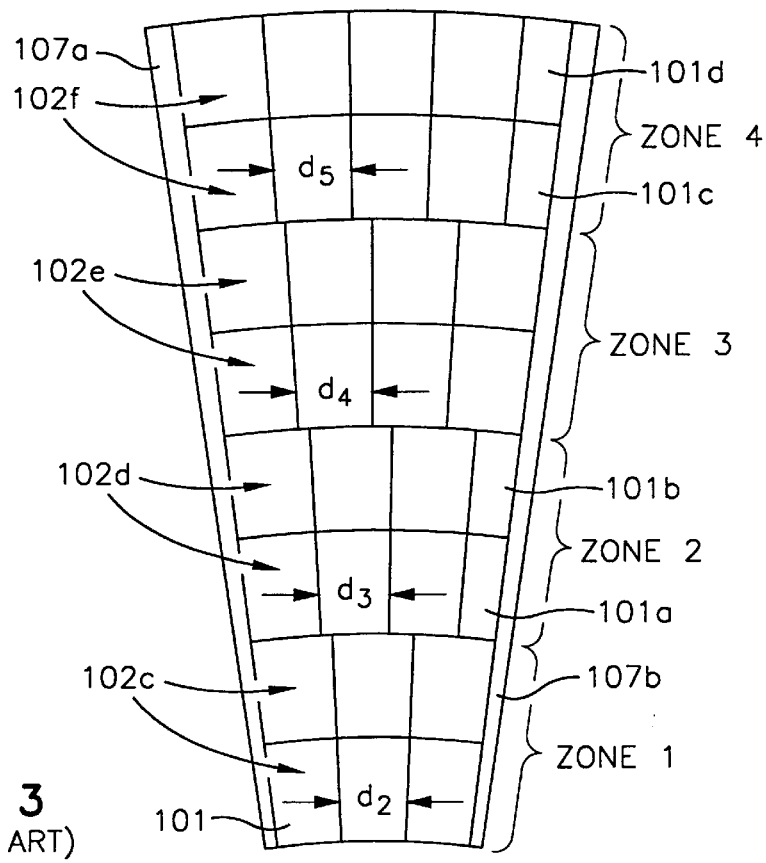
FIG. 3 is an illustration of a portion of a medium in which data cells are split across servo sectors.
Figure 5:
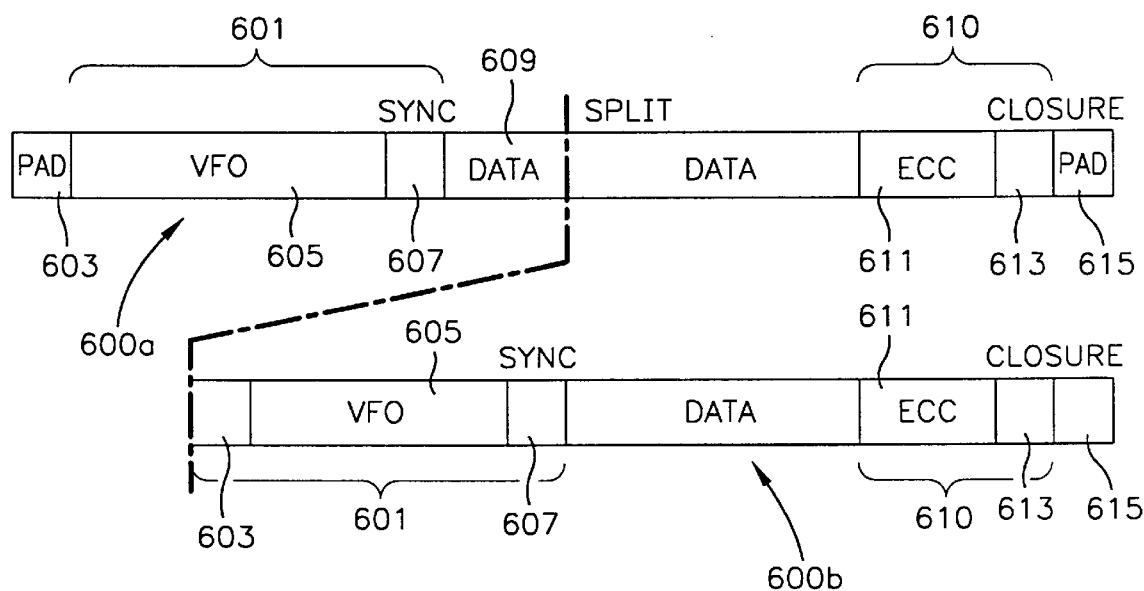
FIG. 5 is an illustration of one data cell format which may be used with the data cells of the present invention.

FIG. 5 is an illustration of one data cell format which may be used with the data cells of the present invention. It will be clear to those skilled in the art that other data cell formats may be used. Each data cell 600 includes both a header 601 and trailer 610, each of which include a predetermined number of bytes of information. In the example provided in FIG. 5, the header 601 includes a first tolerance pad 603, a variable frequency oscillator (VFO) 605, and a synchronization ("sync") field 607. The header 601 is followed by a data field 609. A trailer 610 follows the data field, and includes an error correction field 611, a Viterbi field 613, and a second tolerance pad 615. The data cell overhead includes each of the bytes of the data cell except for those bytes of the data field 609.

The first and second tolerance pads 603, 615 provide a gap between the VFO 605 and the Viterbi field 613 within adjacent data cells. The tolerance pads 603, 615 are provided to ensure that the write head does not try to record over adjacent data cells because of timing inaccuracies caused by spindle speed variation or rotational vibrations. The VFO field 605 provides a pattern to which the phase lock oscillator within the synthesizer 511 can be synchronized. Accordingly, variations in the rotational velocity of the medium can be taken into account at the beginning of each data cell 600. In addition, the VFO pattern can be used to adjust the gain of the AGC circuit 28, and to provide information used to adjust equalizer circuits within the data channel. The sync field 607 provides a pattern which synchronizes the data channel to the beginning of each byte. The data field 609 includes information which is provided by the user. The length of the data field 609 determines the format of the DASD. For example, common formats have data cells that are 512 bytes in length, 520 bytes in length, 528 bytes in length, etc. up to a typical maximum of 738 bytes. The header 601 and trailer 610 are each preferably of constant length. Therefore, the data field 609 must vary in order to adjust the overall length of the data cell. The error correction field 611 provides information which is used to detect and correct any read or write errors that have in the data field 609. The Viterbi field 611 includes closure bytes used to aid in the decoding of the information read from the medium.

FIG. 5 also illustrates the manner in which a data cell 600 is split in accordance with the present invention. When a data cell 600a is split, a data cell 600b is formed from each portion of the data cell 600a. That is, each split data cell 600b must have all the same fields as a data cell 600a which has not been split. In addition, in accordance with the preferred embodiment of the present invention, splits may only occur in the data field 609. In an alternative embodiment of the present invention, splits may occur at other locations within the data cell.

Those skilled in the art should understand that the disk 12 comprises a magnetic storage medium 64 deposited on a substrate 66. It should also be understood that the preferred embodiment is described with reference to the sector servo system illustrated in FIG. 4. However, the teachings of the present invention apply equally well to other storage systems using servo-controlled heads. As the disk 12 of FIG. 4 is rotated relative to the magnetic read/write head 16, the head transduces the information recorded in the tracks 54.

Figure 6:
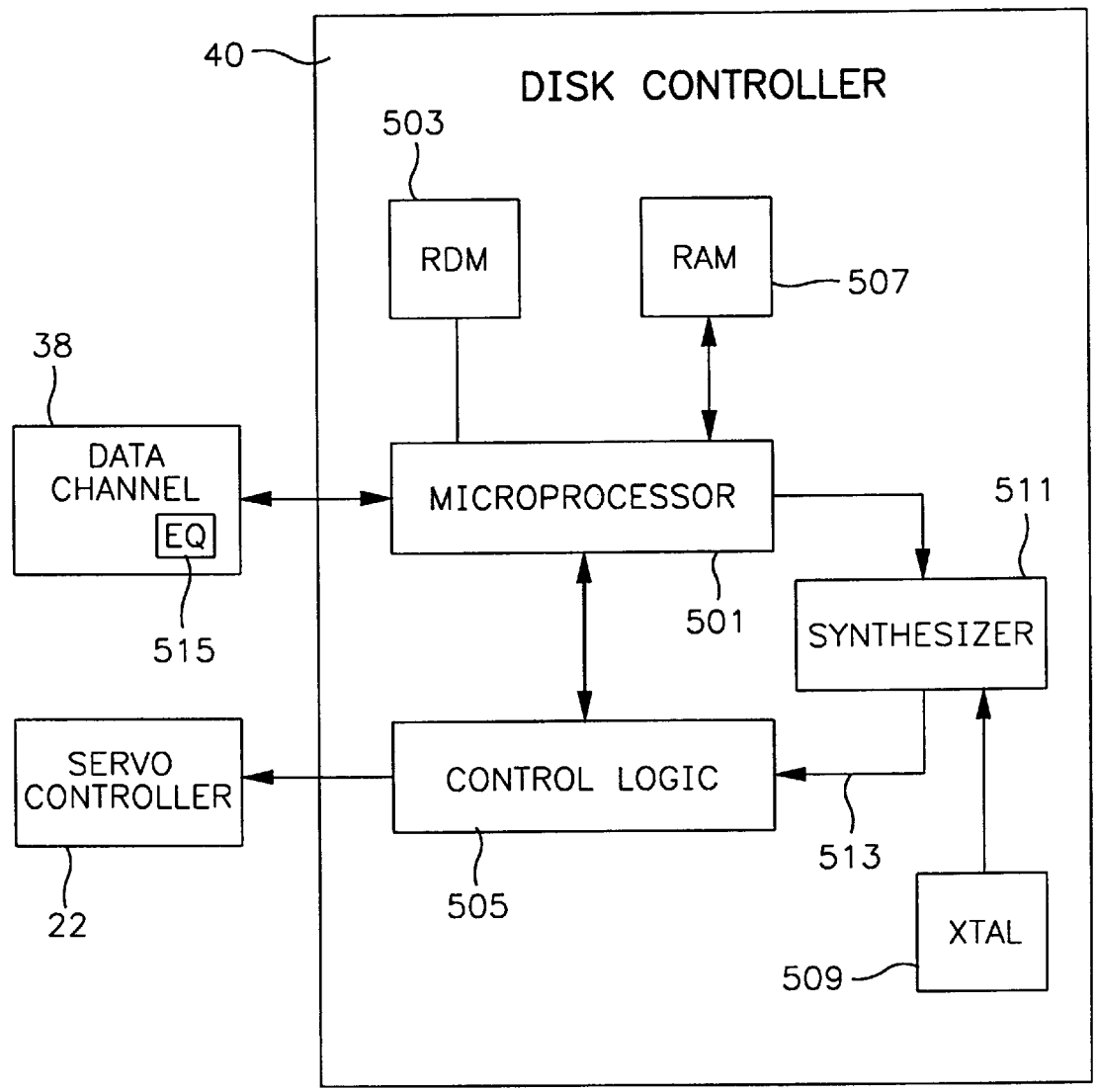
FIG. 6 is a more detailed block diagram of disk controller 40 of the present invention.

FIG. 6 is a more detailed block diagram of disk controller 40 of the present invention. In accordance with one embodiment of the present invention, the disk controller 40 includes a microprocessor 501, a read-only-memory (ROM) 503, a control logic circuit 505, and a random-access-memory (RAM) 507. It will be understood by those skilled in the art that the functions described below as being performed by the microprocessor 501 could alternatively be performed by a state machine, discrete logic, an application specific integrated circuit (ASIC), or any other device which is capable of performing the functions described. Furthermore, the functions described below as being performed by the control logic may be performed by the microprocessor 501, or any other device which performs the functions described below, such as a state machine, or an ASIC.

In accordance with the preferred embodiment of the present invention, upon initial application of power to the DASD 10 of FIG. 4, a microprocessor 501 within the disk controller 40 reads an initialization program from a read-only-memory (ROM) 503. The initialization program provides the microprocessor 501 with instructions which cause the control logic circuit 505 to control the servo controller 22, which in turn causes the VCM driver 46 (see FIG. 4) to move the disk arm 14 such that the head 16 is positioned over a system track. The system track includes information which the disk controller 40 uses to determine the location on the disk of each byte of user information. In accordance with the preferred embodiment of the present invention, the user may select one of several formats (i.e., the size of the user data field of each data cell) supported by the DASD. By storing information related to each of the formats in a separate area of the system track, the microprocessor 501 can select which format is to be implemented based upon user instructions. The user instructions may be stored in a variable that is read from the ROM 503, may be provided via hard wire jumpers, or by any other means. In accordance with one embodiment of the present invention, the system track includes the following information (which is described in greater detail below):

TABLE 1

DRIVE: (information common to all drive formats)
    XTAL    (crystal frequency)
    HC    (header overhead bytes)
    ECC    (error correction bytes)
    TU    (usable recording time between servo sectors)
    RATE    (number of data bits per data clock bits)
    TRK_OD (OD track number)
    W    (data wedges per revolution)
    FMT    (number of formats supported)
    FORMAT: (specific to each user data block size)
        DATA    (user data block size for this format)
        Z    (number of zones per disk surface)
        ZONE:    (data needed to define each zone)
            TRK_ID (ID track number for this zone)
            P    (Period of split pattern)
            N    (numerator of synthesizer, f=XTAL*N/D)
            D    (denominator of synthesizer, f=XTAL*N/D)
            EQ    (number of equalizer sub-zones)
            EQUALIZER:    (data for each equalizer sub-zone)
                TRK_ID    (ID track number for sub-zone)
                COEFFICIENTS    (equalizer coefficients)

As can be seen from Table 1, "DRIVE" information is provided which includes the following fields: (1) XTAL field; (2) HC field; (3) ECC_byte_count field; (4) TU field; (5) TRK_OD field; (6) W field; and (7) FMT field. In addition, a number of FORMAT areas equal to the value stored in the FMT field are included within the DRIVE information. Each FORMAT area contains information particular to one particular format from among the many formats which may be supported by the DASD (details regarding the contents of the FORMAT areas are provided below). In accordance with the preferred embodiment of the present invention, information that is stored in each of the first seven fields is common to all possible DASD formats and zones.

The XTAL field maintains a value equal to the frequency of a crystal 509 used by a synthesizer 511 to derive a data clock signal which is coupled over signal line 513 to the control logic 505. The data clock frequency is generated by the synthesizer 511 and synchronized to the rate at which data is to be read from and written to the medium. The frequency of the data clock is determined by the microprocessor 501 and is predetermined for each zone to which data is to be read and written and for each DASD format (as will be discussed in greater detail below). The synthesizer 511 is essentially a conventional phase lock oscillator phase locked to information read from the header of each data cell. The synthesizer 511 generates the clock frequency in accordance with the formula XTAL*N/D; where XTAL is the crystal frequency, N is a first synthesizer variable and D is a second synthesizer variable. The data rate is controlled by the values of the two synthesizer variables, N and D, which are each provided to the synthesizer by the microprocessor 501. As can be seen from Table 1, the values of N and D are stored in each "ZONE" section on the system track (as will be discussed in greater detail below).

The HC field maintains a value that is equal to the number of overhead bytes in the data cell format, not including the ECC bytes. The value stored in the HC field is independent of the DASD format. However, as should be clear to those skilled in the art, depends upon the data cell format.

The ECC field maintains a value that is equal to the number of ECC bytes and is a function of the particular error correction code used. Any reliable error correction code may be used in accordance with the present invention.

The TU field maintains a value that is equal to the usable recording time value. The usable recording time value is the amount of time the read/write head 16 remains over one data wedge 56. The usable recording time depends upon the rotational velocity of the medium and the angular dimensions of the data wedges 56. Each data wedge 56 is preferably of equal angular dimensions. Alternatively, the usable recording time value can be determined by the angular velocity of the medium and the number and angular dimension of the servo patterns 60 which separate each data wedge 56. The useable recording time between servo sectors is converted into "total wedge bytes" by multiplying it by the data clock frequency and RATE, all divided by 8 data bits per byte.

The TRK_OD field maintains a value that is equal to the track number of the farthest track from the center of the medium.

The W field maintains a value that is equal to the number of data wedges 56 on the medium. This number is also the number of servo patterns in each track.

As can be seen from Table 1, the FORMAT area includes the following fields: (1) DATA field; and (2) Z field. In addition, the FORMAT area includes a "ZONE" area in which parameters which are particular to each zone are maintained. The DATA field maintains a value equal to the number of bytes in the data field 609 of each data cell. In accordance with the preferred embodiment of the present invention, each data cell of the DASD has the same format, and thus the same number of data bytes. However, in an alternative embodiment of the present invention, the data cell format is only constant within each zone. Accordingly, the data cell format may vary from one zone to the next. The Z field maintains a value equal to the number of zones. As will be described in more detail below, each zone may include a different number of tracks.

Figure 7:
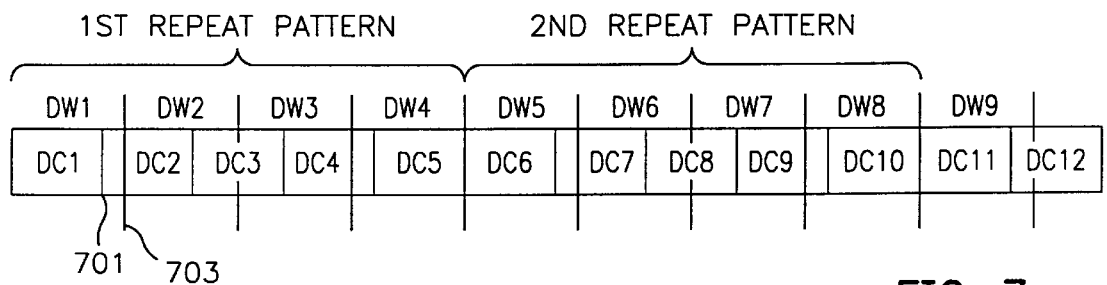
FIG. 7 illustrates a portion of a track in which one and a quarter data cells fit within each data wedge, resulting in a repeat pattern having a period of four.

As can be seen from Table 1, the ZONE area includes the following fields: (1) TRK_ID; (2) P field; (3) N field; (4) D field; and (5) EQ field. In addition, the ZONE area includes an "EQUALIZER" area in which coefficients which are particular to each equalizer sub-zone are maintained. The TRK-ID field maintains the track number of the inner most track within the zone. Accordingly, the number of tracks within a particular zone can be calculated by subtracting the TRK-ID of the zone from the TRK-ID of the next adjacent outer zone. The P field maintains a value equal to the period of the repeat pattern of the split data cells. For example, FIG. 7 illustrates a portion of a track in which one and a quarter data cells (DC) fit within each data wedge (DW), resulting in a repeat pattern having a period of four. Vertical lines 701 represent the boundaries of the data cells and vertical lines 703 represent servo patterns which divide at least some of the data cells between data wedges 56. It should be understood that FIG. 7 shows only a portion of one track within a data wedge 56. However, each other track within the same zone will be essentially identical to the track that is shown. The first data wedge DW1 includes the first data cell DC1 and the first quarter of the second data cell DC2. The second data wedge DW2 includes the remaining portion of the second data cell DC2 and a first half of a third data cell DC3. The third data wedge WD3 includes the remaining half of the split third data cell DC3 and three quarters of the fourth data cell DC4. The fourth data wedge DW4 includes the last quarter of the split fourth data cell DC4 and the fifth data cell DC5. It can be seen from FIG. 7 that this pattern will repeat, since every fifth data wedge starts with the beginning of a new data cell which has not been split at the end of the previous data wedge. Therefore, the pattern will repeat with a period of four data cells. Accordingly, a first repeat pattern includes data wedges DW1–DW4 and data cells DC1–DC5. Likewise, a second repeat pattern includes data wedges DW5–DW8 and data cells DC6–DC10. This is further exemplified by the fact that data wedge DW9 starts a third repeat pattern.

As described above, the values represented in the N and D fields are used by the synthesizer 511 to determine the rate at which data will be read and written to the medium. Since the bit density of the data will depend upon both the data rate and the length of the track on which the data is being either read or written, the bit density at the inner tracks of each zone will preferably be as close as possible to the maximum that the medium and the channel can reliably handle. However, at the outer tracks of the zone, the bit rate will be lower due to the increased length of the track (i.e., and the resulting increased angular velocity of the medium). Accordingly, by setting the values of N and D to appropriate values for each zone, the bit density of the zone is maximized.

As can be seen from Table 1, the EQUALIZER area includes the following fields: (1) TRK_ID; and (2) COEFFICIENTS. The TRK_ID field within the EQUALIZER area maintains a value which represents the track number of the inner most track of the equalizer sub-zone. That track number then serves to identify and define the size of each equalizer sub-zone. In accordance with one embodiment of the present invention, the COEFFICIENTS field maintains the values of coefficients of an equalizer circuit 515 (see FIG. 6). Alternatively, the coefficients are determined empirically by measuring the VFO patterns within each data cell upon initialization. Accordingly, the coefficients are not stored on the medium and the COEFFICIENTS field is not required.

The information that is read by the microprocessor 511 from the system track is stored in the RAM 507. This information is then used to generate split tables in accordance with the present invention. Split tables are used by the control logic 505 to determine whether each track within a particular data wedge 56 starts with a split cell, and if so, how much of the previously started cell has yet to be written or read. Accordingly, split tables are used to determine when the read and write timing should be started and stopped for each data cell. In one embodiment of the present invention, one split table is generated for each zone. Each such split table includes one entry for each data wedge 56.

Each entry to the split table includes at least the following four values: (1) FLAG1; (2) FIRST; (3) FLAG2; and (4) LAST. In accordance with the preferred embodiment of the present invention, each entry also includes the following two additional values: (5) NEW; and (6) CNT. FLAG1 is a one bit flag which indicates that the first data cell of the data wedge associated with this entry is a split data cell. FIRST is a variable, the value of which is equal to the number of user data bytes in the split data cell that begins each track wedge of the data wedge. If the data wedge does not start with a split data cell, then the value of FIRST is preferably zero. However, in an alternative embodiment of the present invention, the value of FIRST is irrelevant (and therefore may be any value) if the first data cell is not a split data cell, as indicated by FLAG1. In yet another alternative embodiment, no FLAG1 is provided. Rather, if the value of FIRST is equal to zero, then the first data cell is not a split data cell. NEW is a variable, the value of which is equal to the number of new data cells that are started in the track wedge (i.e., the number of data cells in which the first user data byte of the data cell has been stored in each track of the data wedge).

CNT is a variable, the value of which is equal to the number of the first data cell of each track wedge in modulo X, where X is equal to the total number of data cells within the repeat pattern. For example, in the track shown in FIG. 7, in the entry associated with data wedge DW4, the CNT value is "4", since the fourth data cell in the repeat pattern is the first data cell in this data wedge. In the entry associated with DW6, the CNT value would is "2", since the second data cell DC7 in the second repeat pattern is the first data cell in the data wedge DW6. It should be noted that in this example, X is equal to 5, since there are a total of 5 data cells in each repeat pattern. FLAG2 is a one bit flag which indicates that there is a split data cell at the end of the data wedge. LAST is a variable, the value of which is equal to the number of bytes in the data field 609 in the last data cell written in each track wedge in the zone. In accordance with one embodiment of the present invention, no FLAG2 flag is provided. Rather, if the value of LAST is equal to the length of the data field, then the last data cell within each track wedge is not a split data cell. However, it should be understood that in the preferred embodiment of the present invention, a data cell must be split such that at least one byte of the data field 609 of the data cell is recorded on each side of the servo pattern 60 that splits the data cell. The method by which this is accomplished is explained in detail below.

Since the split tables of the present invention are generated from a relatively small amount of information that is stored in either the system track or ROM 503, a substantial amount of non-volatile storage (i.e., either ROM or medium capacity) is saved. Furthermore, in the preferred embodiment of the present invention, one split table is generated for each zone, and each split table has only one entry for each data wedge within a repeat pattern. Accordingly, if a particular zone has a repeat pattern with a period of four, then only four entries are required for all of the data wedges of that zone. In one embodiment of the present invention, one zone has 1060 tracks with a repeat pattern of one, each track having 90 data wedges. Therefore, a conventional split table in which each track within a zone is the same would require 90 entries (i.e., one per data wedge). In contrast, the present invention only requires a single entry, since the repeat pattern for this zone has a period of one. It will be clear that a repeat pattern of one means that none of the data cells in the zone have been split. In this same embodiment of the present invention, the zone having the most split data cells has a repeat pattern of 10. Therefore, 10 entries are required for all 90 of the data wedges in that zone. In contrast, a conventional DASD would still require 90 split table entries. It should be noted that one of the advantages of the present invention is that zones which have a very low repeat pattern period are extended to include more tracks in order to take advantage of the inherent efficiency of not having to generate additional entries in the split table, and not having to include additional data cell overhead bytes associated with split data cells (i.e., additional data cell headers and trailers). Further details regarding the method by which the present invention selects the size of each zone is provided below.

Method for Generating Split Tables

Figure 8:
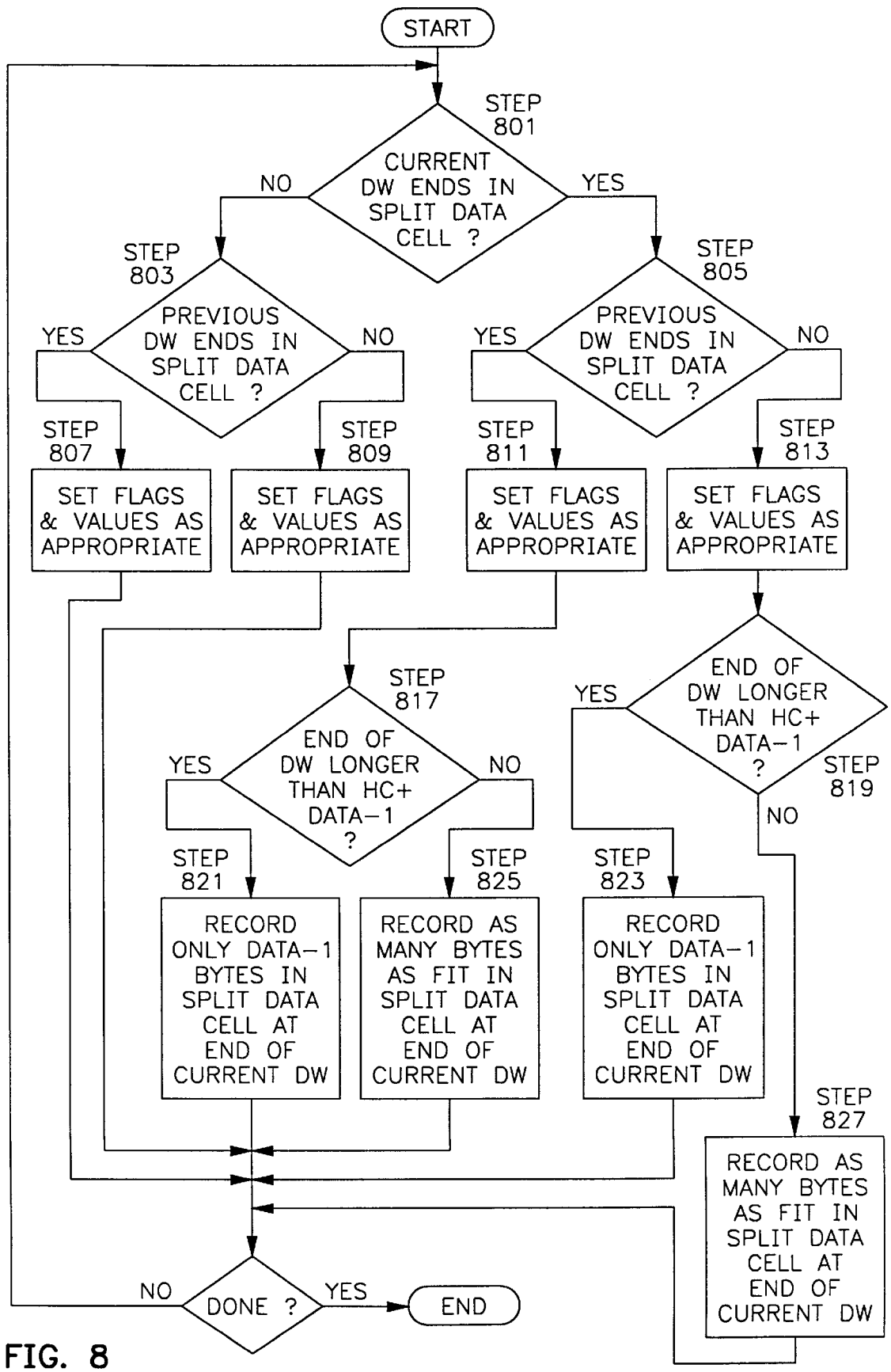
FIG. 8 is a high level flowchart of the method used to generate the split tables in accordance with one embodiment of the present invention.

The method used to generate the split tables in accordance with one embodiment of the present invention is illustrated in the high level flowchart of FIG. 8. Initially, the first data wedge 56 is checked to determine whether the current data wedge ends in a split data cell (STEP 801) (i.e., do an integer number of data cells fit within the data wedge). If an integer number of data cells do not fit within the data wedge, then the last data cell will be split, assuming that there will be sufficient room remaining within the data wedge to fit at least the header and one data byte of the data cell to be split. That is, in order to satisfy the requirement that at least one data byte be recorded on each side of a servo sector 61, the space which remains after the last whole data cell is recorded in a data wedge must be large enough to allow the header, trailer, and one data byte of the data cell which is to be split to be recorded. Otherwise, the last data cell will not be split.

Regardless of whether the last data cell in the current data wedge is split or not, a check is made to determine whether the previous data wedge ended in a split data cell (STEPs 803 and 805). Alternatively, STEPs 803 and 805 can inquire whether the current data wedge begins with a split data cell. This should be clear, since a split data cell at the end of the immediately preceding data wedge must be completed at the beginning of the current data wedge. It can be seen from the flowchart of FIG. 8 that the flow path splits into four separate paths, each path being associated with one of the four possible combinations of the current and previous data wedge ending in a split data cell. Next FLAG1 and FLAG2 are set to indicate whether the current data wedge begins and ends in a split data cell (STEPs 807, 809, 811, and 813). It will be clear that the particular path that is traversed will determine the values of these two flags. In addition, the values of the variables FIRST, LAST, NEW, and CNT can all be determined for those data wedges which do not end in a split data cell (STEPs 809 and 811), as will be discussed in more detail below. In the case in which the last data cell of the data wedge is split, the values of FIRST, NEW and CNT can each be determined (STEPs 811 and 813), as will be discussed in more detail above. However, the value of LAST depends upon whether the end of the data wedge is long enough that all the user data bytes will be recorded on the current data wedge. If the end of the data wedge is longer than the length of the overhead plus the length of the user data (STEPs 817 and 819), then only DATA user data bytes will be stored at the end of the current data wedge (where "DATA" is the number of bytes in the DATA field of the data cell) (STEPs 821 and 823). Otherwise, as many data bytes as will fit are recorded in the split data cell at the end of the data wedge (STEPs 825 and 827). The actual number of data bytes that will be stored is determined by subtracting the overhead HC from the length of the remainder of the data wedge, as will be discussed in detail below. Once the values of the split table for the current data wedge are determined, then the process repeats for each data wedge within the repeat pattern until the entire split table has been completed (STEP 829).

A more detailed illustration of the method used to generate the split tables in accordance with one embodiment of the present invention is provided in the following pseudo code:

TABLE 2

```
START  (Choose P and F for zone Z where F is the data rate
**            frequency in bytes/sec and P is the number of data wedges
**            after which the split pattern repeats)
**        C<=0 (C is the data cell count within a repetition of
**            the first non-split data cell in a data wedge)
**        X<=0 (X is the user data bytes written as a split in the
**            previous data wedge)
**        FOR I <=1 to P (fill out the split table for P
**                    consecutive data wedges)
**          BEGIN
**          M <= floor( (floor(Tu*F) + X)/DC )
**                (number of whole data cells of size DC whose
**                writing was completed in the current data wedge)
**                Note that Tu is the usable time is seconds in which
**                data can be written for the current data wedge.
**                Note also that the value of the function "floor(x)"
**                is the argument x rounded down to the nearest integer.
**          E <= floor(Tu*F) + X) - DC*M
**                (number of bytes in the current data wedge that
**                are left over after writing the M whole data cells)
**          IF (E < HC+1 (test to see if the data bytes left over
**                            in the current data wedge are too few
**                            to write one or more bytes as a split)
**            THEN (no split is written at the end of this data
**                    wedge)
**                IF X>0 (test to see whether or not a split needs
**                            to be finished from the previous data
**                            wedge and save the split table
**                            parameters)
**                    THEN BEGIN (Yes a split needs to be finished)
```

TABLE 2-continued

```
**                    FLAG1(I)=1
**                    FIRST(I)=DATA-X
**                    NEW(I)=M-1
**                    CNT(I)=C
**                    FLAG2(I)=0
**                    LAST(I)=0
**                    X <= 0
**                    C <= C+M-1
**                    END
**                ELSE BEGIN (No a split doesn't need finishing)
**                    FLAG1(I)=0
**                    FIRST(I)=0
**                    NEW(I)=M
**                    CNT(I)=C
**                    FLAG2(I)=0,
**                    LAST(I)=0
**                    X <= 0
**                    C <= C+M
**                    END
**            ELSE (a split is written at the end of this data wedge)
**                IF X>0 (test to see whether or not a split needs
**                       to be completed from the previous data
**                       wedge and save the split table
**                       parameters)
**                    THEN BEGIN (Yes a split needs to be finished)
**                        FLAG1(I)=1
**                        FIRST(I)=DATA-X
**                        NEW(I)=M
**                        CNT(I)=C
**                        FLAG2(I)=1
**                    IF (E > HC+DATA-1 (Test to see if
**                           all of the user data can be
**                           written in the split and write
**                           the appropriate number of bytes
**                           that can be written)
**                        THEN BEGIN
**                            LAST(I)= DATA,
**                            X <= DATA
**                            END
**                        ELSE BEGIN
**                            LAST(I)= E-HC,
**                            X <= E-HC
**                            END
**                    C <= C+M
**                    END
**                ELSE BEGIN (No a split doesn't need finishing)
**                    FLAG1(I)=0
**                    FIRST(I)=0
**                    NEW(I)=M+1
**                    CNT(I)=C
**                    FLAG2(I)=1
**                    IF (E > HC+DATA-1) (Test to see if
**                           all of the user data can be
**                           written in the split and write
**                           the appropriate number of bytes
**                           that can be written)
**                        THEN BEGIN
**                            LAST(I)= DATA,
**                            X <= DATA
**                            END
**                        ELSE BEGIN
**                            LAST(I)= E-HC,
**                            X <= E-HC
**                            END
**                    C <= C+M+1
**                    END
V         END
```

Figure 9:
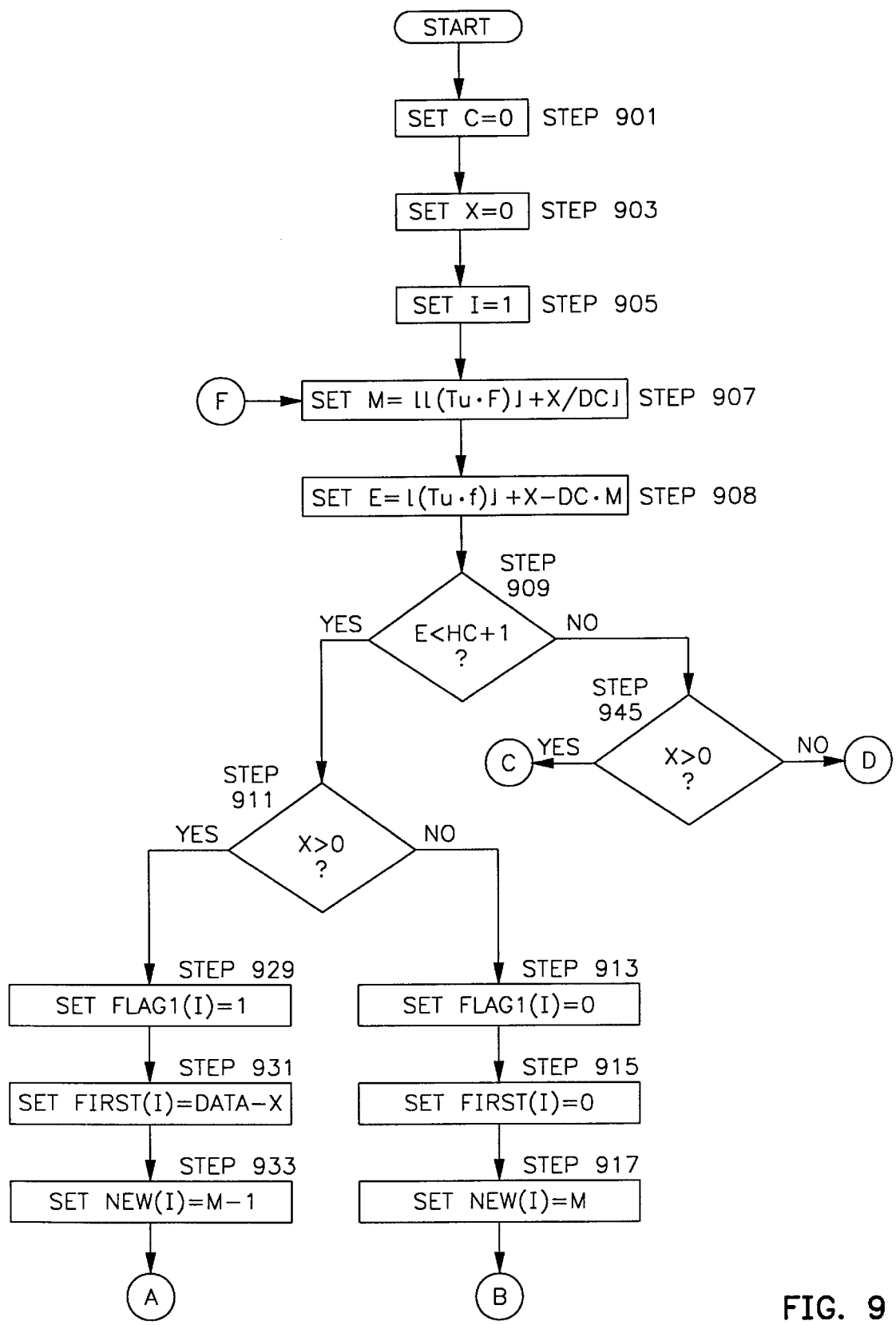
FIG. 9 is a detailed flowchart which illustrates the method used to generate the split tables in accordance with one embodiment of the present invention.
Figure 9:
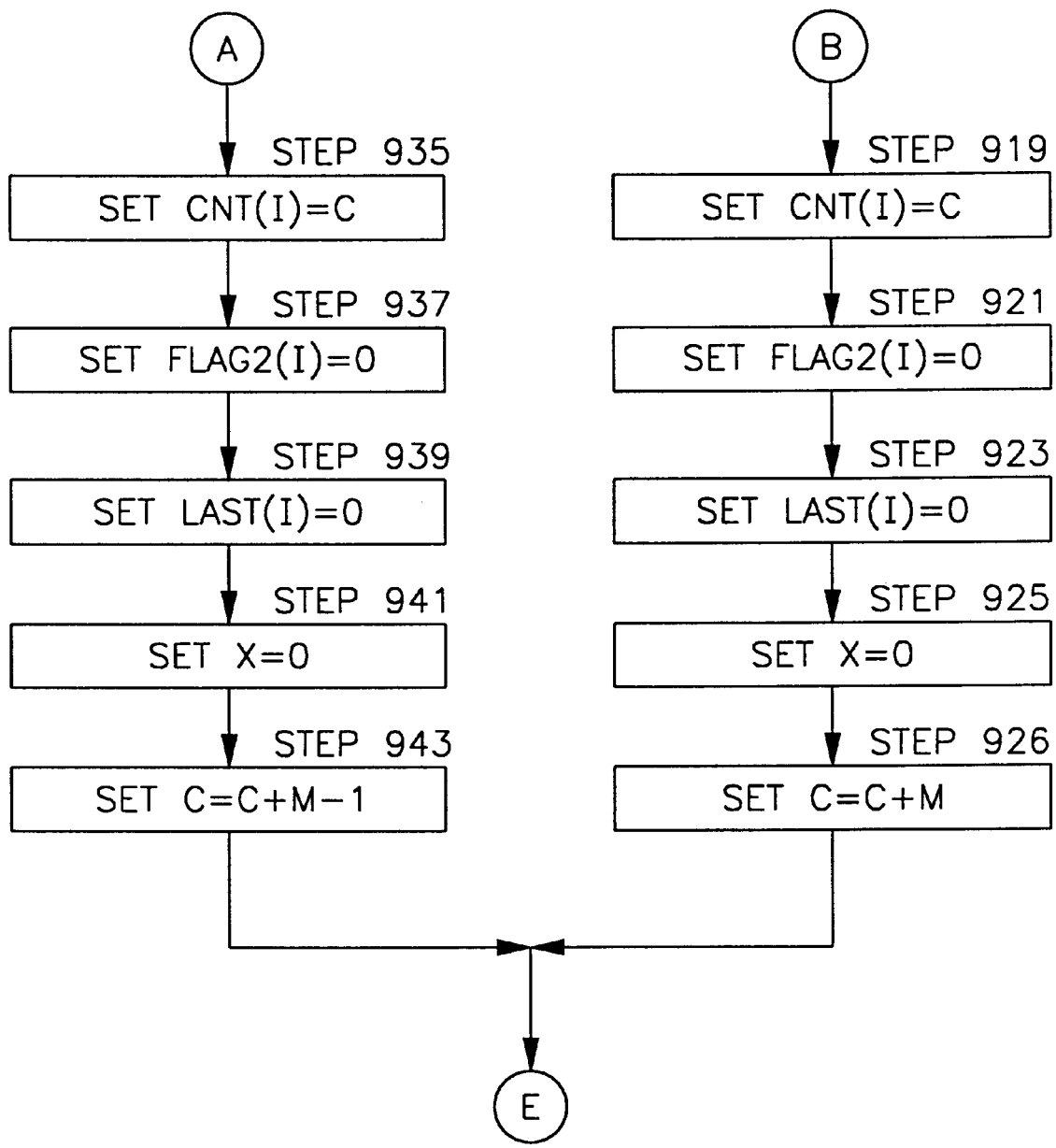
Figure 9:
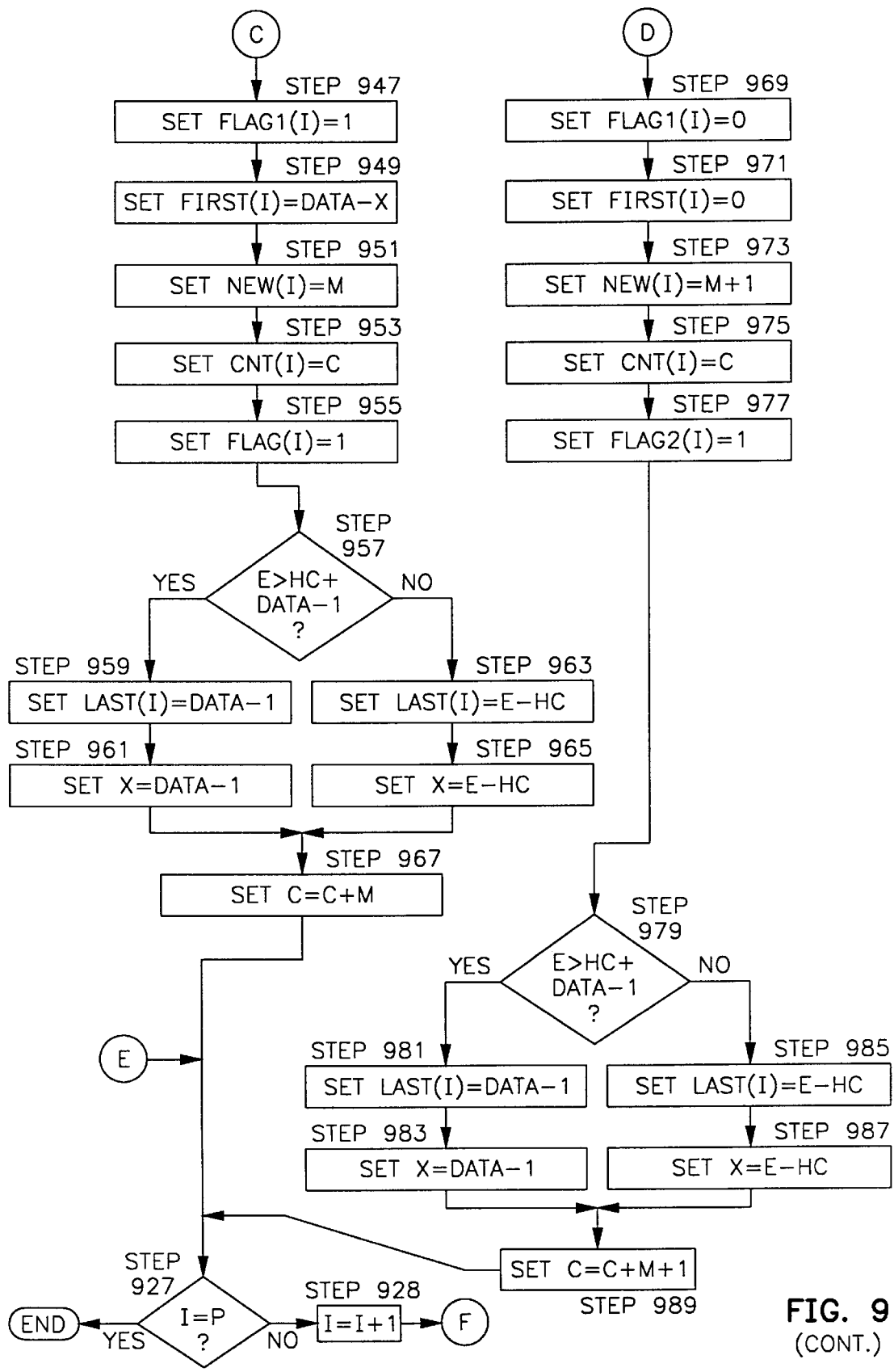

FIG. 9 is a flowchart which illustrates the steps performed in accordance with the embodiment of the present invention shown in the pseudo code presented above in TABLE 2. In accordance with one embodiment of the present invention, the method presented in the flowchart of FIG. 9 and the pseudo code of TABLE 2 is preferably performed by the microprocessor 501 shown in FIG. 6.

The method shown in FIG. 9 begins after the system track has been read and the values of the system track have been stored in RAM 507. These values are made readily accessible to the microprocessor 501. Initially, two variables "C" and "X" are defined and initialized to zero (STEPs 901 and 903). C is the data cell count within a repetition of the first non-split data cell in a data wedge. X is the number of user data bytes that were written in the data field of a split data cell at the end of each track wedge of the adjacent previous data wedge. A counter "I" is initialized to "1" in order to track the number of repetitions through the method loop which includes STEPS 907–927 (STEP 905). "M" is a variable having a value equal to the number of whole data cells of size DC whose writing was completed in the current data wedge, the value of which is determined as follows:

FLOOR((FLOOR($TU \cdot F$)+$X$)/$DC$) (STEP 907)

where the value of the function "FLOOR (x)" is the argument x rounded down to the nearest integer; TU is the value which represents the amount of time the read/write head 16 remains over one data wedge 56, and as such, the amount of time during which data cells can be written to one track wedge, taken from the TU field of the system track;
F=XTAL (N/D)/9, the rate at which bytes of data are read or written to the medium;
XTAL is the value taken from the XTAL field of the system track;
N is the value taken from the N field of the system track;
D is the value taken from the D field of the system track; and
DC is the sum of the values taken from the HC field, the ECC field, and DATA field (i.e., the total number of bytes in a data cell).

Figure 10:
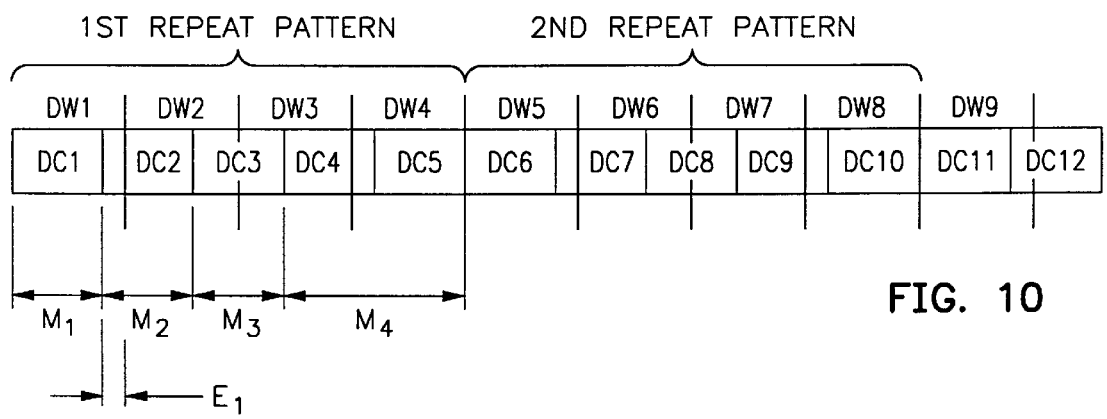
FIG. 10 provides a pictorial representation of the value $M_1$.

It can be seen that since TU is the amount of time during which bytes of data cells can be written to a track wedge 62, and F is the frequency at which such bytes of data cells are written, that TU×F is equal to the number of bytes that fit within each track wedge of a data wedge 56. Therefore, the M value is equal to the number of whole data cells that fit within the sum of a whole track wedge plus that portion at the end of the adjacent previous track wedge in which a split data cell was written. It should be clear that if X is equal to zero, then M is equal to the number of whole data cells that can fit within one track wedge of the data wedge 56. Note that since M is equal to the floor of the quotient calculated in STEP 907, that any portion of a data cell that is split at the end of the data wedge 56 is not considered in the value of M. FIG. 10 provides a pictorial representation of the value $M_I$ where I is the value of the counter and represents the number of the entry being generated. From FIG. 10 it can be seen that the value of $M_1$ (i.e., the value of M when the entry associated with the first data wedge is being generated) is equal to one.

E is a function, the value of which is determined as follows:

Floor ($TU \cdot F$)+$X$)–$DC \cdot M$ (STEP 908)

Accordingly, E is equal to the number of bytes left over after each whole data cell is fit into a length equal to the length of a track wedge plus the length of that portion at the end of an adjacent previous track wedge in which a split data cell was written. Therefore, the value of $E_1$ is equal to the number of bytes in the beginning portion of DC2 which lies within the first data wedge DW1.

As will be seen below, the remainder of the process is divided into four paths. Selection of one of these four paths is determined by whether the current data wedge will end in a split data cell, and whether the previous data wedge ended in a split data cell (i.e., whether the current data wedge will start with a split cell).

A determination is made as to whether the number of bytes that are left over (i.e., E) in each track wedge of the current data wedge is less than the number of overhead bytes ("HC") plus one (STEP 909). If so, then the last data cell of the current data wedge will not be properly split. That is, each data cell must be split such that at least one byte of the data field lies on each side of the servo sector 61 which splits the data cell. If E is less than HC+1, then this rule would be violated, since no data bytes would remain in the current data wedge DW(I). That is, if E is less than HC+1, then at best there will only be sufficient space remaining in DW(I) after M data cells are stored to store the overhead bytes associated with a split data cell. Therefore, if the result of the comparison in STEP 909 is true, then no split cell will be written at the end of the current data wedge DW(I). Accordingly, either the first or second path will be taken.

A check is then made of the value of X (STEP 911). If the value of X is greater than zero, then a split data cell was written at the end of the adjacent previous data wedge 56. Accordingly, the current data wedge must start with a split data cell. Accordingly, the first path would be taken. Alternatively, if the value of X is not greater than zero (i.e., the value of X is equal to zero), then no split data cell was written in the previous data wedge and the second path is taken.

It should be clear that on the first pass through STEP 909 the value of X will equal zero (i.e., the result of the inquiry in STEP 911 is no), since the current data wedge is the first in the repeat pattern. Accordingly, FLAG1(I) is deasserted (STEP 913), and FIRST(I) is set to zero (STEP 915). A variable "NEW(I)" is set to M (STEP 917). NEW(I) is the number of data cells that begin in the data wedge $DW_I$. A value of CNT(I) is then set to the value of C (STEP 919), which is still equal to zero on the first pass through STEP 919. CNT(I) is the byte number of the first byte in the $I^{th}$ track wedge, each byte in a repeat pattern being numbered sequentially starting with zero at the beginning of each repeat pattern. FLAG2(I) is deasserted (STEP 921) and LAST(I) is set to zero (STEP 923), since there is no split data cell at the end of the data wedge. Furthermore, the value of X is set to zero (STEP 925) and the value of C is set to C+M (STEP 926). That is, if both the first and last data cell were not split data cells, as indicated by the fact that the answer to STEP 809 was yes and the answer to STEP 811 was no, then the value of M is an accurate count of the number of new data cells started in each track wedge of the current data wedge DW(I). A determination is then made as to whether the number of data wedges within the repeat pattern have been processed (i.e., whether I=P) (STEP 927). If so, then the process ends for this zone, and the next zone is processed similarly, with the parameters which are relevant to the new zone being used. If instead there are additional data wedges to be processed (i.e., I is less than P), then I is incremented by one (STEP 928) and the process repeats from (STEP 907).

However, if X is greater than zero (STEP 911) and the first path is taken, then FLAG 1(I) is asserted (STEP 929) and FIRST(I) is set to DATA–X (STEP 931). That is, the value of FIRST(I) is set to the length of the DATA field of a data cell minus the number of bytes that are present in the data field of the split data cell at the end of the track wedge of the adjacent previous data wedge. As will be seen below, the value X includes only data bytes from the data field, and does not include any overhead bytes. Accordingly, FIRST(I) is equal to the number of bytes which must be included in the data field of the first data cell of each track wedge of the current data wedge DW(I). The value of NEW(I) is set to M–1 (STEP 933). That is, the value of M was calculated to include the split data cell at the beginning of the current data wedge DW(I) and the current data wedge DW(I) did not end in a split data cell. Therefore, the value of M must be decremented by one to accurately reflect the number of new data cells started in each track wedge of the current data wedge DW(I). This can be seen pictorially from FIG. 10 which shows that $M_4$ is equal to "2", since DC5 ends within the boundaries of DW(4) (i.e., both DC4 and DC5 are included in $M_4$. However, only one new data cell (i.e., DC5) has been started in each track wedge of the data wedge DW(4). CNT(I) is set equal to C (STEP 935). FLAG2(I) is deasserted (STEP 937), LAST(I) is set to zero (STEP 939), and X is set to zero (STEP 941), since the data wedge does not end in a split data cell. The value of C is set to C+M−1 (STEP 943).

If, instead, E is not less than HC+1 (i.e., there sufficient room at the end of the last data wedge to allow the overhead bytes and at least one byte of the data field to be stored at the end of the current data wedge DW(I)) (STEP 909), then no split data cell is recorded at the end of the data wedge and either the third or the fourth path is taken. The value of X is checked to determine whether a split data cell needs to be completed from the previous data wedge (STEP 945), and thus which path from among the third and fourth is to be taken. If X is greater than zero, then the previous data wedge ended in a split data cell and the third path is taken. Accordingly, FLAG1(I) is set to indicate that the current data wedge begins with a split data cell (STEP 947). The variable FIRST(I) is set equal to DATA−X (i.e., the number of bytes in a data field, minus the number of bytes that were written in the split data cell of the previous data wedge) (STEP 949). NEW(I) is set equal to M (STEP 951), since the number of data cells that begin in each track wedge of the data wedge DW(I) will be equal to the value M whenever both the current data wedge starts with a split data cell and also ends with a split data cell, as is the case when the third path is traversed (i.e., whenever the response to the inquiry at STEP 909 is negative, and the response to the inquiry at STEP 945 is positive). CNT(I) is set to the value of C (STEP 953). Furthermore, since the current data wedge will end in a split data cell, FLAG2(I) is asserted (STEP 955). Next, a check is made whether the entire data field can be stored in the end of the current data wedge by testing whether E>HC+DATA−1 (STEP 957). If true, then the entire data cell fits. Therefore, both LAST(I) and X are set to DATA (STEPS 959 and 961, respectively). If the inquiry of STEP 957 is false, then LAST(I) and X are both set to E−HC (i.e., the overhead is subtracted from the value of X to remove the overhead bytes and indicate only the number of data bytes in each split data cell at the end current data wedge 56) (STEPS 963 and 965, respectively). Regardless of the answer to the inquiry in STEP 957, the value of C is set to C+M (STEP 967). That is, if both the first and last data cell were split data cells, then the value of M is an accurate count of the number of new data cells started in each track wedge of the current data wedge DW(I). A determination is then made as to whether the number of data wedges within the repeat pattern have been processed (i.e., whether I=P) (STEP 927). If so, then the process ends for this zone, and the next zone is processed similarly, with the parameters which are relevant to the new zone being used. If instead there are additional data wedges to be processed (i.e., I is less than P), then I is incremented by one (STEP 928) and the process repeats from (STEP 907).

However, if X is not greater than zero (STEP 945), then the current data wedge does end in a split data cell, but the previous data wedge did not end in a split data cell. Therefore, the fourth path is taken. Accordingly, FLAG1(I) is reset to indicate that the current data wedge does not begins with a split data cell (STEP 969).

The variable FIRST(I) is set equal to zero (STEP 971). NEW(I) is set equal to M+1 (STEP 973), since the number of data cells that begin in each track wedge of the data wedge DW(I) will be equal to the value M+1 whenever both current data wedge does not start with a split data cell but does end with a split data cell, as is the case when the fourth path is traversed (i.e., whenever the response to the inquiry at STEP 909 is negative, and the response to the inquiry at STEP 945 is negative). CNT(I) is set to the value of C (STEP 975). Furthermore, since the current data wedge will end in a split data cell, FLAG2(I) is asserted (STEP 977). Next, a check is made to ensure that the data cell trailer of the last data cell will not be split by testing whether E>HC+DATA−1 (STEP 979). If true, both LAST(I) and X are set to DATA−1 (STEPS 981 and 983, respectively) to ensure that at least one byte of the data field is written in each portion of the split data cells that will end the current data wedge 56 and begin the next data wedge 56. If the inquiry of STEP 979 is false, then LAST(I) and X are both set to E−HC (i.e., the overhead is subtracted from the value of X to remove the overhead bytes and indicate only the number of data bytes in each split data cell at the end current data wedge 56) (STEPS 985 and 987, respectively). Regardless of the answer to the inquiry in STEP 979, the value of C is set to C+M+1 (STEP 989). That is, if the current data wedge ends in a split data cells, but the previous data wedge does not, then the value of M is an inaccurate count of the number of new data cells started in each track wedge of the current data wedge DW(I) and must be incremented by one. A determination is then made as to whether the number of data wedges within the repeat pattern have been processed (i.e., whether I=P) (STEP 927). If so, then the process ends for this zone, and the next zone is processed similarly, with the parameters which are relevant to the new zone being used. If instead there are additional data wedges to be processed (i.e., I is less than P), then I is incremented by one (STEP 928) and the process repeats from (STEP 907).

Generation of the split table then continues as described above until the entire split table is complete. Each time STEPS 907 through 927 are performed, one entry into the split table is generated. As stated above, P (i.e., the period of the repeat pattern) entries into the split table are required for each table. Each table is appropriate to one of the zones. Therefore, a split table is preferably generated for each zone. The split tables prepared for each zone differ due to the differences in the number of entries in each such split table (i.e., differences in the period of the repeat pattern within each zone) and the values of N and D (and thus the data rate) associated with each zone. Neither the number of tracks within the zone or the number of track wedges within a track need be known in order to generate each of the required split tables in accordance with present invention. However, it should be clear that the data rate and the period of the repeat pattern of each zone must be determined prior to generation of the split tables. Furthermore, the number of zones must be defined, since one split table must be generated for each zone.

Determination of the Size and Data Rate of Each Zone

As stated above, the characteristics of each of the zones must be defined prior to generation of the split tables. This is clear from the above stated fact that the information, such as the number of zones, and the rate at which data is written within each zone is used to generate each split table. This information is read from the system track upon initial application of power to the DASD in accordance with the preferred embodiment of the present invention. Because the split tables of the present invention are stored in RAM 507, each split table is preferably regenerated each time power is removed and reapplied. By storing the split tables in RAM 507 rather than on the medium or in non-volatile ROM 503, valuable ROM and medium storage capacity are preserved.

In an alternative embodiment, the time required to generate the required split tables can be saved by storing the split tables in either ROM 503 or on the medium in the system track. Nonetheless, the flexibility of generating and regenerating the split tables for other DASD formats (and thus optimizing the zones for the new format) is maintained as long as the ROM 503 or medium can be overwritten.

Each zone is defined by the rate at which data is read and written to the data cells within each zone. Accordingly, all of the data to be read and written within each zone is read and written at one fixed data rate. However, the rate at which data is read and written differs from zone to zone. A first factor in determining the rate at which data is to be read and written within a particular zone is the maximum rate at which data can reliably be stored. The maximum rate at which data can be reliably stored and read from the medium is a function of the density of the magnetic particles which coat the medium, the construction of the read/write head which is used, the ability of the data channel to decode the data, and other such factors. The repeat pattern that would result from writing data cells of a predetermined size at the maximum data rate is plotted for each track. Since the goal is to use the medium in the most efficient manner, a calculation is made to determine the amount of user data (i.e., the number of bytes with the data field of each data cell) that can be stored on each track at the maximum data rate, taking into account the added inefficiency due to the splitting of data cells (referred to as "data cell split inefficiency"). This can then be compared to the number of user data bytes that can be stored at rates which are less than the maximum data rate, but which results in lower data cell split inefficiency due to smaller repeat pattern periods. Once the rate at which data can be read and written most efficiently to the medium within the inner most track of the medium has been determined, the size of the zone must be determined. In accordance with one embodiment of the present invention, this is done by repeating the process of comparing the efficiency at the maximum data rate possible with the efficiency which results from maintaining the same data rate used in the last track (i.e., including the track in the previous zone). The amount of overhead required to support the creation of a new zone must be included in the calculation of the efficiency that results from each possible data rate in each new track. That is, information related to that zone must be stored in the system track when a new zone is created, thus reducing the overall efficiency of the medium. This reduction in the efficiency must be included in the calculation.

The format optimizing process consists first in identifying the potential starting tracks for zones, and then eliminating the least efficient zones until the desired number of zones is obtained. In general tracks that have the best efficiency and that are the candidates for the beginning of a zone have a small split repetition period and have a repetition period that exactly divides the number of data wedges per revolution of the disk.

In the preferred embodiment of the present invention, the number of zones is predetermined. For example, in one embodiment of the present invention, there are sixteen zones. Therefore, tradeoffs may have to be made in order to reduce the number of zones that may otherwise be desirable. That is, in order to reduce the number of zones, the size of some of the zones may need to be larger than would otherwise result in the most efficient use of the medium. However, in an alternative embodiment of the present invention, any number of zones may be used in order to further increase the efficiency of the DASD.

Figure 11:
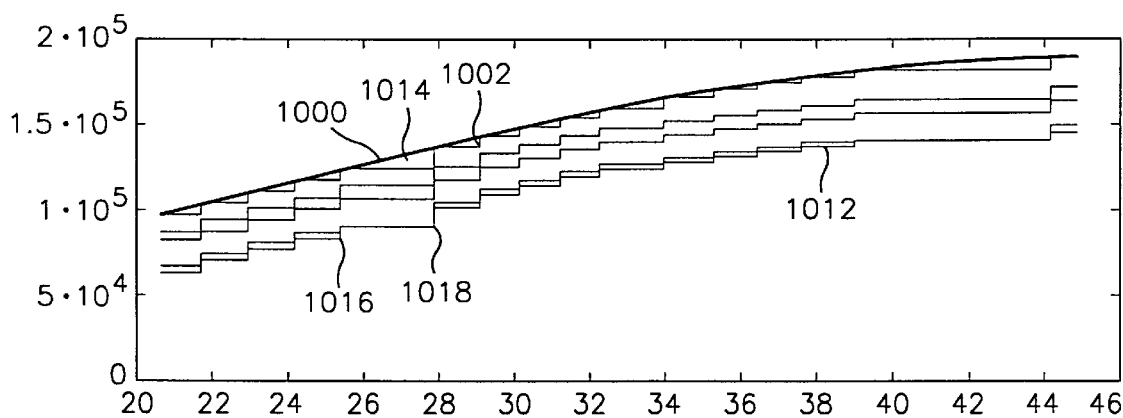
FIG. 11 is a plot of the amount of data that is stored in a DASD in accordance with one embodiment of the present invention.

FIG. 11 is a plot of the amount of data that is stored in a DASD in accordance with one embodiment of the present invention. The plot of FIG. 11 shows the amount of data in the vertical axis and the radius of the track in which the data is stored in the horizontal axis. A stair step pattern is generated by the use of zones in which each track stores the same amount of data. It should be noted that longer horizontal portions of the curve indicate larger zones in which more tracks are included. The upper curve 1000 represents the maximum data that can be reliably stored at each radius of the DASD. The next lower stair step curve 1002 shows the amount of data that is stored in each track after accounting for the fact that the data rate is held constant for each track within a particular zone. The stair step curve 1012 illustrates the inefficiency which is due to splitting data cells. That is, the inefficiency which results from the fact that each split data cell requires an additional header and trailer. Accordingly, for the same amount of data to be stored in a split data cell as in a data cell which is not split, the overhead is double.

It should be clear that the inefficiency that results from increasing the size of some of the zones can be measured as the area 1014 between the curve 1000 and the curve 1002 over that portion of the curve that includes the zone in question. Therefore, it is clear that as more tracks are included within a particular zone, the efficiency of the zone is reduced. However, offsetting this reduction in efficiency is an increase in the overall efficiency realized in the present invention by the fact that some zones have very little (and in fact zero) inefficiency due to split data cells. For example, the fifth zone represented between points 1016 and 1018 has no inefficiency due to split data cells. This is because the period of the repeat pattern for the fifth zone is equal to one. Therefore, no data cells are split in the fifth zone. In accordance with the present invention, the reduced inefficiency due to the difference between the maximum data rate at which information can be read to and written from a track and the data rate of the zone of which the track is a part must be compared to the gain in efficiency due to the fact that the zone has a particular repeat pattern period. Clearly, for zones that have a relatively high repeat pattern period, a smaller difference between the maximum possible rate and the rate of the current zone will be tolerated before starting a new zone. Conversely, for zone having a relatively low repeat pattern period, a greater difference between the maximum possible rate and the rate of the current zone will be tolerated before starting a new zone. Since these inefficiencies can be measured, the determination as to whether to start a new zone or not will be made on the basis of such measurements in order to provide a track with the highest overall efficiency. The determination may be iterative if the number of zones is predetermined. For example, if the total number of zones is predetermined to be sixteen, and the first fifteen zones are defined to be relatively short by the above method such that the sixteenth zone is too long, some, or all, of the first fifteen zones will have to be lengthened in order to reduce the length of the sixteenth zone.

In accordance with one method for determining the size of each zone, the factors of the number of data wedges are first calculated. For example, if there were 8 data wedges on the media, then the factors of 8 are calculated. These are 1, 2, and 4. Therefore, in accordance with this method, only repeat patterns of 1, 2, and 4 would be acceptable. Next, the points are noted on the curve 1000 at which the maximum data rate results in one of the acceptable split pattern periods. These points define the zone boundaries. If this process results in more the desired number of zones, then some of the candidate zones are eliminated and the previous zone is elongated to include the tracks that would have been in the zone that was eliminated. Selection of the zone(s) to be eliminated is made by determining the resulting degradation in efficiency.

Figure 12:
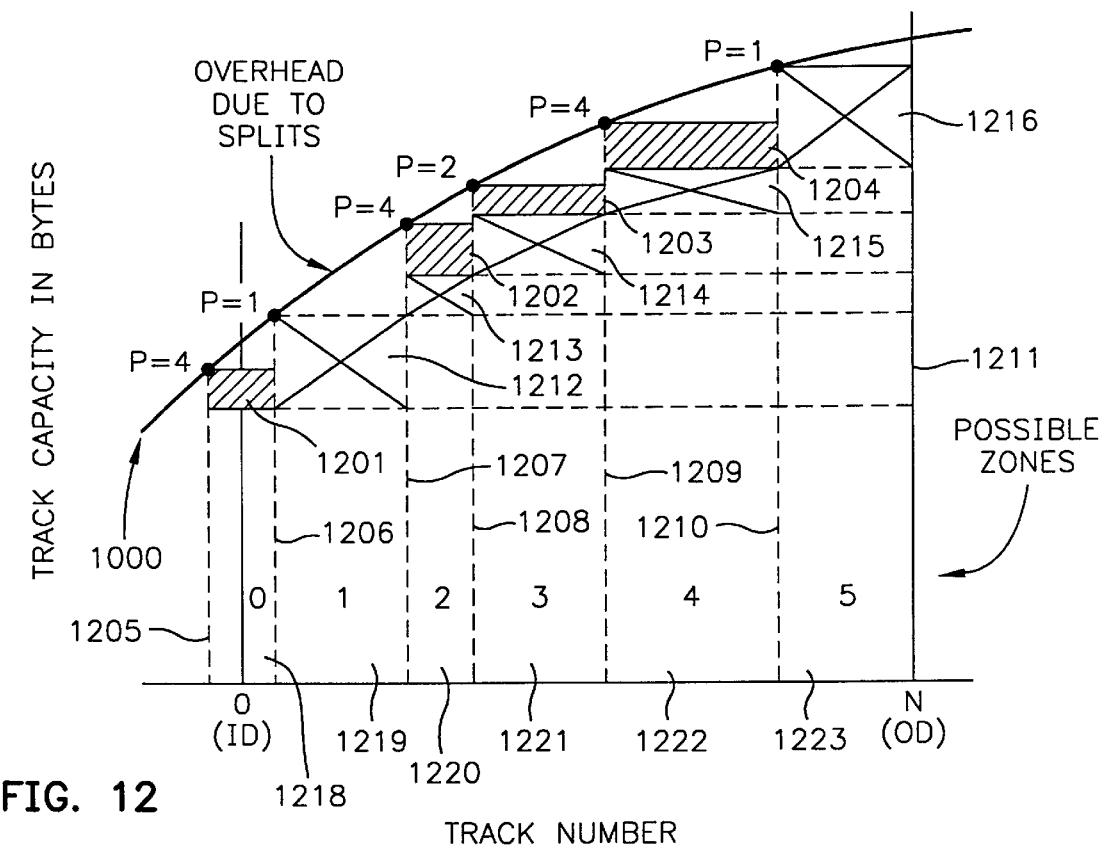
FIG. 12 is a graph which plots the track capacity in bytes in the abscissa and the track number in the ordinate.
Figure 13:
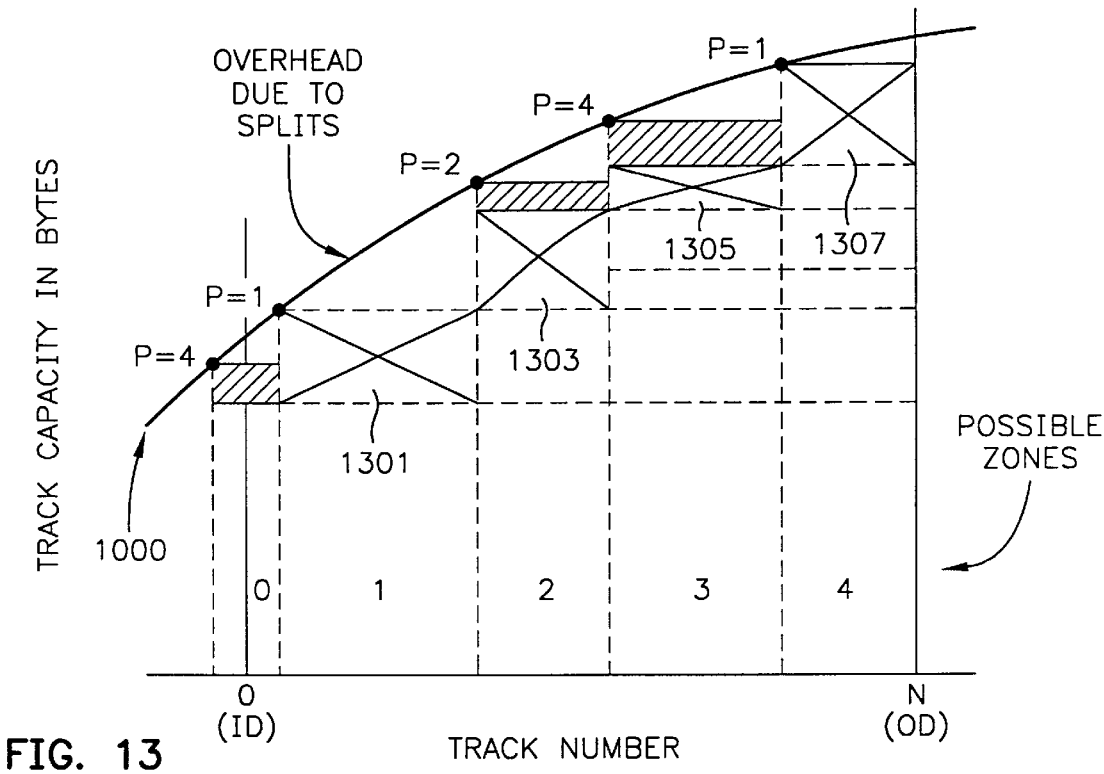
FIG. 13 illustrates the changes to the graph of FIG. 12 after elimination of one zone.

The determination can be made by referring to a graph, such as the graph shown in FIG. 12. FIG. 12 is a graph which plots the track capacity in bytes in the abscissa and the track number in the ordinate. The beginning and end of each candidate zone 1218–1223 are defined by vertical lines 1205–1211. Each vertical line 1205–1211 terminates at a point on the curve 1000 at which the maximum data rate results in one of the acceptable split pattern periods. Rectangles 1201–1204 representing the inefficiency caused by the use of split data cells in a zone are formed as follows. The top of each rectangle 1201–1205 is the capacity at which data could be stored without accounting for the loss in capacity due to the splitting of data sectors. The bottom of each rectangle 1201–1205 is the capacity at which data could be stored taking into account the loss in capacity due to the splitting of data sectors. The sides of each rectangle are the vertical lines 1205–1211. Additional rectangles 1212–1216 are shown in FIG. 12. The bottom of each rectangle 1212–1216 is the track capacity of the previous zone. The top of each rectangle 1212–1216 is the track capacity of the zone in which the rectangle lies. If only one zone need be eliminated, then eliminating the zone associated with the rectangle 1212–1216 having the smallest total area would result in the most efficient media. If more than one zone must be eliminated, then the net capacity loss must be calculated for each group of zones that are eliminated. It should be noted that as a zone is eliminated, the bottom of the rectangle 1212–1216 in the zone which follows the eliminated zone will be lowered to the level of the zone which precedes the eliminated zone. FIG. 13 illustrates the changes to the graph of FIG. 12 after elimination of one zone 1220. It can be seen that as zone 1219 expands, the result is the expansion of rectangle 1212 (FIG. 12) to become rectangle 1301 (FIG. 13). Also, rectangle 1214 (FIG. 12) in zone 1221 expands to become rectangle 1303 (FIG. 13). This process can then be repeated by once again eliminating the zone associated with the rectangle 1301, 1303, 1305, 1307 having the smallest total area.

Equalizer Sub-Zones

Due to the fact that some zones may include a relatively large number of tracks, it may be necessary in some embodiments of the present invention to divide at least some zones into a plurality of equalizer sub-zones. That is, the coefficients of the equalizer used to decode information read from the medium are dependent upon the bit density at which the data is written to the medium. Typically, these coefficients remain constant for each of the tracks within a zone. However, in the present invention, the use of larger zones increases the difference between the bit density of the least dense track and the most dense track within the same zone. Therefore, the equalizer coefficients which are appropriate to the least dense track of a zone may not be appropriate to the most dense track within that same zone. Accordingly, by dividing the zones into smaller equalizer sub-zones and storing in the system track the coefficients which are to be used with each track within each such equalizer sub-zone, the present invention ensures that the information read from each track will be properly equalized for the particular bit density of that track. In accordance with the present invention, each zone includes at least one unique equalization sub-zone.

However, in an alternative embodiment, the definition of the equalization sub-zones may be independent of the definition of the zones. In such an embodiment, the EQUALIZATION area within the system track would not be maintained within the ZONE area of the system track, but rather within the FORMAT area (see TABLE 1).

In accordance with one embodiment of the present invention, the microprocessor 501 reads the equalization coefficients from the system track and stores each coefficient in RAM 507 for communication to the equalizer circuitry 515 within the data channel 38 (see FIG. 6) when the read/write head 16 is over the associated equalizer sub-zone.

The particular system and method for generating split tables and increasing the efficiency with which data is stored in a DASD as herein shown and described in detail is fully capable of attaining the above-described objects of the invention. However, it is to be understood that the system and method described herein is the presently preferred embodiment of the present invention and is thus representative of the subject matter which is broadly contemplated by the present invention. The scope of the present invention fully encompasses other embodiments which may become obvious to those skilled in the art. Furthermore, the scope of the present invention is to be limited by nothing other than the appended claims.

We claim:

1. A method for formulating a storage area having servo sections, including the steps of:

a. selecting a data cell size; and b. selecting zone boundaries to optimize data capacity on the storage area taking into account at least the inefficiency due to data cells being split across two servo zones and the inefficiency which results from adding additional tracks to the servo zone.

2. The method of claim 1, wherein the step of selecting servo zone boundaries includes the steps of:

a. selecting a radial distance to be the inner boundary of an innermost zone;

b. calculating the rate at which data can be most efficiently written in a track at the inner boundary;

c. comparing the efficiency with which data can be stored at the rate calculated in step (b) with the efficiency at which data can be stored at higher data rates up to the maximum rate at which data can be reliably stored for track adjacent to the innermost track; and d. if a higher data rate results in a higher efficiency, then ending the previous zone and starting a next zone; otherwise, repeating step (c) for a track adjacent to the track for which efficiency was last compared in step (c).

3. A disk recording media, comprising a plurality of tracks, the first track being located at an inner and the last track being located at an outer radius, each track being associated with a track number, the track numbers being sequential starting with the inner track, and each track being capable of storing a multiplicity of data cells and being divided by servo sectors positioned at the same relative rotational position within each track, each track being grouped into one of a plurality of zones, the track number for the innermost track of each zone being selected to optimize the total stored capacity of the disk for each zone by determining the optimum number of tracks per zone such that the combined data capacity loss due to using zones and splitting the data cells within each track is minimized for the entire media.

4. The disk recording media of claim 3, further comprising a split table for each zone, the table describing where, relative to the position of the servo sectors, data cells are located.

5. The disk recording media of claim 4, wherein each split table includes the following entries associated with each data wedge within a repeat pattern in the zone:
   a. a first entry for determining number of bytes within the first data cell of the associated data wedge; and
   b. a second entry for determining the number of bytes within the last data cell of the data wedge.

6. The disk recording media of claim 5, wherein each data cell is numbered sequentially, starting from the first data cell of the first data wedge within a repeat pattern, each split table further includes the following entries:
   a. a third entry for determining the number of new data cells that are started in the associated data wedge; and
   b. a fourth entry for determining the number of the data cell number of the first data cell of each track.

7. The disk recording media of claim 3, further comprising information which is sufficient to allow a split table for each zone to be generated, each split table describing where, relative to the position of the servo sectors, each data cell is located.

8. The disk recording media of claim 3, further including at least one equalizer setting associated with each zone for optimizing data density on the media.

9. The disk recording media of claim 3, wherein several formats are stored on the media to enable the drive user to select a block size, each format comprising a parameter identifying the optimal track to be selected as the inner most track of each zone in order to simultaneously minimize the data capacity lost by using zones and by splitting the data cells within each track.

10. The disk recording media of claim 9, wherein the formats further comprise one equalizer setting associated with each zone.

11. The disk recording media of claim 3, wherein each cell has a fixed size block and a header followed by user data, followed by a trailer.

12. A split table stored within a direct access storage device, the direct access storage device having a medium on which data is stored in data cells which may be split to form a split data cell repeat pattern having a period, each such data cell being stored within a track on the medium, the split table having entries, the number of entries in the split table being related to the period of the split data cell repeat pattern, wherein the split table is stored within volatile memory within the direct access storage device, the split table being newly generated each time power is applied to the direct access storage device.

13. The split table of claim 12, wherein the medium has a system track stored thereon, the split table being generated using information stored within the system track.

14. The split table of claim 13, wherein the information stored within the system track includes:
   a. information which can be used to determine the number of bytes of information that can be stored within one data wedge;
   b. information which can be used to determine the number of bytes within a data cell stored within a data wedge; and
   c. information which can be used to determine the number of overhead bytes within a data cell stored within a data wedge.

15. The split table of claim 14, wherein the direct access storage device further includes a head for reading and writing information to the medium, and wherein the information stored within the system track further includes:
   a. information which can be used to determine the amount of time the head remains over a data wedge; and
   b. information which can be used to determine the frequency at which data is read and written within a data wedge.

16. A method for determining the location of the beginning and end of a data cell stored on a medium of a direct access storage device, the medium being divided into data wedges, each data wedge being capable of storing at least a portion of a data cell therein, at least some of the data cells being split between data wedges in a data cell repeat pattern having a period, the method including the method steps of:
   a. generating a split table including entries, the number of entries to the split table being equal to the period of the data cell repeat pattern; and
   b. reading the entries to the split table in order to determine whether a particular data wedge begins with a split data cell.

17. The method of claim 16, further including the method step of:
   a. reading the entries to the split table in order to determine whether a particular data wedge ends with a split data cell.

18. The method of claim 16, wherein each entry to the split table is associated with each data wedge that occupies the same location within the data cell repeat pattern, the step of generating a split table further includes the method step of:
   a. generating within at least one entry to the split table, a value which is equal to the amount of information that is stored within the split data cell that begins each associated data wedge.

19. The method of claim 18, wherein, the step of generating a split table further includes the method step of:
   a. generating within at least one entry to the split table, an indication that a split data cell begins each associated data wedge.

20. The method of claim 19, wherein, the step of generating the split table further includes the method step of:
   a. generating within at least one entry to the split table, an indication that a split data cell ends each associated data wedge.

21. The method of claim 20, wherein the step of generating the split table further includes:
   a. generating within at least one entry to the split table, an indication of the relative location within the each period of the split data cell repeat pattern of the first data cell with the data wedge associated with that entry which includes the indication of the relative location.

22. The method of claim 21, wherein the step of generating the split table further includes:
   a. generating within at least one entry to the split table, an indication of how many new data cells have been started within each data wedge associated with that entry which includes the indication of how many new data cells have been started.

23. The method of claim 16, wherein each entry to the split table is associated with each data wedge that occupies the same location within the data cell repeat pattern, the step of generating a split table includes the method step of:
   a. generating within at least one entry to the split table, a value which is equal to the amount of information that is stored within the split data cell that ends each associated data wedge.

24. A direct access storage device including a medium for storing information in data cells within tracks sub-divided into data wedges, the tracks being grouped into zones, each zone having information stored thereon at the same data rate throughout the zone and at a different data rate from data stored in each other zone, the data cells being located within each data wedge such that at least some of the data cells are split between data wedges forming a repeating split data cell pattern having a period, the number of tracks included within each zone being inversely proportional to the period of the repeat pattern.

25. The direct access storage device of claim 24, wherein the size of each zone is determined by comparing the efficiency with which data is stored within the zone at one proposed zone size with the efficiency with which data is stored within the zone at each other proposed zone size, and selecting the zone size which results in the greatest overall efficiency.

26. A direct access storage device including:
   a. a medium upon which data can be written and read, the data being organized in tracks which are grouped into zones, the data in each track within the same zone being stored at one data rate, the data rate associated with each zone being different from the data rate associated with each other zone, the data being further organized within each track in data cells which may be split to form a repeating pattern of split data cells having a period;
   b. a system track on the medium on which system information is stored, the system information including:
      i. at least two zone identification numbers, each associated with a corresponding unique zone;
      ii. at least two track ID numbers, each corresponding to an innermost track of a corresponding unique zone identified by the zone identification number;
      iii. at least two values, each equal to the period of the split data cell repeat pattern in a corresponding unique one of the data zones; and
      iv. at least two values, each equal to the data rate at which data is stored in a unique corresponding one of the data zones; and
   c. a means for generating a split table from the information stored on the system track.

* * * * *